United States Patent
Kitazato et al.

(10) Patent No.: US 11,388,485 B2
(45) Date of Patent: *Jul. 12, 2022

(54) RECEIVING DEVICE, RECEIVING METHOD, TRANSMISSION DEVICE, AND TRANSMISSION METHOD

(71) Applicant: SATURN LICENSING LLC, New York, NY (US)

(72) Inventors: Naohisa Kitazato, Tokyo (JP); Yasuaki Yamagishi, Kanagawa (JP); Yoshiharu Dewa, Tokyo (JP); Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,958

(22) Filed: Mar. 9, 2021

(65) Prior Publication Data

US 2021/0329350 A1    Oct. 21, 2021

Related U.S. Application Data

(63) Continuation of application No. 15/327,422, filed as application No. PCT/JP2015/073654 on Aug. 24, 2015, now Pat. No. 10,979,780.

(30) Foreign Application Priority Data

Sep. 5, 2014  (JP) .............................. JP2014-181624

(51) Int. Cl.
*H04N 7/10* (2006.01)
*H04N 21/81* (2011.01)
(Continued)

(52) U.S. Cl.
CPC ....... *H04N 21/814* (2013.01); *H04N 21/2362* (2013.01); *H04N 21/2665* (2013.01);
(Continued)

(58) Field of Classification Search
CPC ............. H04N 21/814; H04N 21/2362; H04N 21/2665; H04N 21/435; H04N 21/438;
(Continued)

(56) References Cited

U.S. PATENT DOCUMENTS 7,577,979 B2    8/2009  Feinleib et al.
8,479,251 B2    7/2013  Feinleib et al.
(Continued)

FOREIGN PATENT DOCUMENTS

JP    2001-136444 A    5/2001
JP    2012-257232 A    12/2012
(Continued)

OTHER PUBLICATIONS

International Search Report dated Nov. 17, 2015, in PCT/JP2015/073654, filed Aug. 24, 2015.
(Continued)

*Primary Examiner* — Jefferey F Harold
*Assistant Examiner* — Sahar Aqil Riaz
(74) *Attorney, Agent, or Firm* — Chris Kolefas

(57) ABSTRACT

The present technology relates to a receiving device, a receiving method, a transmission device, and a transmission method for operation of various services.

The receiving device acquires trigger information for providing various functions, the trigger information containing type information indicating the type of trigger information and channel information indicating a series for each function provided by the trigger information. The receiving device performs processing corresponding to each function on the basis of the trigger information identified by the type infor- (Continued)

mation and the channel information. The present technology is applicable to a television receiver being able to receive a digital broadcast signal, for example.

18 Claims, 34 Drawing Sheets

(51) Int. Cl.
| | | |
|---|---|---|
| *H04N 21/438* | (2011.01) | |
| *H04N 21/435* | (2011.01) | |
| *H04N 21/6543* | (2011.01) | |
| *H04N 21/2362* | (2011.01) | |
| *H04N 21/2665* | (2011.01) | |
| *H04N 21/462* | (2011.01) | |
| *H04N 21/643* | (2011.01) | |

(52) U.S. Cl.
CPC ......... *H04N 21/435* (2013.01); *H04N 21/438* (2013.01); *H04N 21/4383* (2013.01); *H04N 21/4622* (2013.01); *H04N 21/64322* (2013.01); *H04N 21/6543* (2013.01); *H04N 21/8173* (2013.01)

(58) Field of Classification Search
CPC ........... H04N 21/4383; H04N 21/4622; H04N 21/64322; H04N 21/6543; H04N 21/8173; H04N 21/4348; H04N 21/23614; H04N 21/2368; H04N 21/2381; H04N 21/4343; H04N 21/4347
USPC .......................................................... 725/33
See application file for complete search history.

(56) References Cited

U.S. PATENT DOCUMENTS

| | | |
|---|---|---|
| 9,743,158 B2 | 8/2017 | Hasek |
| 9,749,667 B2 | 8/2017 | Lee |
| 2002/0162118 A1 | 10/2002 | Levy |
| 2003/0204854 A1 | 10/2003 | Blackketter |
| 2005/0028206 A1 | 2/2005 | Cameron |
| 2008/0222300 A1 | 9/2008 | Bouazizi |
| 2008/0231750 A1 | 9/2008 | Suzuki |
| 2009/0262238 A1 | 10/2009 | Hope |
| 2009/0291631 A1 | 11/2009 | Xue |
| 2010/0162333 A1 | 6/2010 | Sylvain |
| 2012/0291064 A1 | 11/2012 | Kitazato |
| 2013/0078925 A1 | 3/2013 | Aguirre |
| 2013/0191860 A1* | 7/2013 | Kitazato ............ H04N 21/2362 725/32 |
| 2013/0325931 A1 | 12/2013 | Cheng |
| 2014/0040968 A1* | 2/2014 | Kitazato ............ H04N 21/8586 725/115 |
| 2014/0150015 A1 | 5/2014 | Matsumura |
| 2014/0156800 A1 | 6/2014 | Falvo |
| 2014/0201779 A1 | 7/2014 | Oh et al. |
| 2015/0052570 A1 | 2/2015 | Lee |

FOREIGN PATENT DOCUMENTS

| | | |
|---|---|---|
| KR | 10-2007-0047074 A | 5/2007 |
| WO | WO 2012/157738 A1 | 11/2012 |
| WO | WO 2013/058633 A1 | 4/2013 |
| WO | WO 2013/111630 A1 | 8/2013 |
| WO | WO 2014/084510 A1 | 6/2014 |

OTHER PUBLICATIONS

Extended European Search Report dated Jan. 29, 2018 in Patent Application No. 15837292.0, 8 pages.

Ohmata, H. et al. "Hybridcast: A new media experience by integration of broadcasting and broadband", ITU Kaleidoscope Academic Conference: Building Systainable Communities (K-2013), XP032679915, Apr. 22, 2013, pp. 1-8.

Baba, A. et al. "Seamles, Synchronous, and Supportive: Welcome to Hybridcast: An advanced hybrid broadcast and broadband system", IEEE Consumer Electronics Magazine, vol. 1, No. 2, XP011440218, Apr. 1, 2012, pp. 43-52.

Japanese Office Action dated Apr. 2, 2019 in Patent Application No. 2016-546425, 10 pages (with unedited computer generated English translation).

Japanese Office Action dated Aug. 27, 2019 in Japanese Patent Application No. 2016-546425 with translation.

* cited by examiner

FIG. 3

| DATA STRUCTURE | BIT NUMBER | BIT STRING CODE | DESCRIPTION |
|---|---|---|---|
| Trigger_data() { | | | |
|   number_of_trigger | 3 | uimsbf | TRIGGER NUMBER N |
|   trigger_map_number | 4 | uimsbf | TRIGGER MAP NUMBER M 16M bits |
|   trigger_name_flag | 1 | bslbf | TRIGGER NAME FLAG |
|   for(i=0; i<N; i++) { | | | |
|     channelID | 8 | uimsbf | TRIGGER CHANNEL ID |
|     cmdID | 8 | uimsbf | COMMAND ID (TRIGGER TYPE) |
|     version | 8 | uimsbf | VERSION FOR EACH TRIGGER CHANNEL |
|     length | 8 | uimsbf | BYTE NUMBER OF TRIGGER |
|     if(trigger_name_flag==1) { | | | |
|       name_length | 8 | uimsbf | TRIGGER NAME LENGTH |
|       for(j=0; j<L; j++) { | | | |
|         trigger_name_byte | 8 | bslbf | TRIGGER NAME |
|       } | | | |
|     } | | | |
|   } | | | |
|   for(i=0; i<M; i++) { | | | |
|     trigger_map_bits | 16 | bslbf | TRIGGER MAP: BIT MAP INDICATING CURRENTLY-TRANSMITTED TRIGGER TYPE |
|   } | | | |
|   for(i=0; i<N; i++) { | | | |
|     for(j=0; j<L; j++) { | | | |
|       URI_byte | 8 | bslbf | TRIGGER BODY = URI |
|     } | | | |
|   } | | | |
| } | | | |

FIG. 4

| cmdID | Function | URI | description |
|---|---|---|---|
| 0 | Trigger List Access | TLT URL | ACQUIRE Trigger channel List, AND ACQUIRE Trigger channel Map |
| 1 | App access1 | AIT URL | APPLICATION CONTROL VIA AIT (+other App Sig file) |
| 2 | App access2 | App entry URL | DIRECT APPLICATION CONTROL |
| 3 | SC access | MPD URL | HYBRID DELIVERY/REPRODUCTION VIA MPD |
| 4 | Subtitle Access | Signaling/TTML URL | TTML DELIVERY + Trigger DIRECT SUBTITLE DELIVERY |
| 5 | ESG Access | ESG URL | ESG |
| 6 | EAD access | EAD URL | EAD DELIVERY + Trigger DIRECT EA SERVICE |
| 7 | Rating Access | RRD URL | RRD DELIVERY + Trigger DIRECT rating DESIGNATION |
| 8 | PDI Access&Upload | PDI | COLLECTION OF PERSONAL INFORMATION BY EVOKING OF PDI answer upload FROM PDI Query DELIVERY |
| 9 | Audience data Upload | Audience Server URL | FORWARD VIEWING DATA TO DESIGNATED SERVER TO COLLECT VIEWING DATA |
| 10 | Self ref | Broadcast URL | FOR SELF-RECOGNITION OF BROADCAST STREAM REFERRED TO IN MPD |

FIG. 6

| Element/Attribute (with@) | Cardinality | Description |
|---|---|---|
| TLT | | Trigger List Table |
|   TriggerChannel | 1..n | TRIGGER CHANNEL |
|     @channelID | 1 | TRIGGER CHANNEL ID |
|     @cmdID | 1 | COMMAND ID (TRIGGER TYPE) |
|     @version | 0..1 | VERSION |
|     @name | 0..1 | TRIGGER NAME |

FIG. 7

SCS Trigger format

- Trigger URI format
  Trigger = locator_part [ "?" terms ]
- locator_part: MPD file URL
- terms = media_time [ "&" spread ] [ "&" version ] [ "&" others ]

FIG. 10

ESG Trigger format

- Trigger URI format
  Trigger = locator_part [ "?" terms ]
- locator_part: ESG URL
- terms = programID[ "&" scope] [ "&" spread ] [ "&" version ]
  [ "&" others ]
- <scope>
  — s=<number>
  — number: program number   1:current only  2:current/next  3:current/next 3 ...

FIG. 13

EAD Trigger format

- Trigger URI format
    Trigger = locator_part [ "?" terms ]
- locator_part: EAD URL
- terms = <EA_message>
  <EA_message>
  — e=<eaMessageId> . <message> [ "&e=" <eaMessageId>.<message>]*

FIG. 16

Rating Trigger format

- Trigger URI format
    Trigger = locator_part [ "?" terms ]
- locator_part: RRT URL
- terms = <rating>
  <rating>
  — r=<rating_region>.<rating_dimension_j>.<rating_value>[ "&r="
  <rating_dimension_j>.<rating_value>]*

RECEIVING DEVICE, RECEIVING METHOD, TRANSMISSION DEVICE, AND TRANSMISSION METHOD

CROSS REFERENCE TO RELATED APPLICATIONS

This application is a continuation of U.S. application Ser. No. 15/327,422, filed on Jan. 19, 2017, and is based upon and claims the benefit of priority to International Application No. PCT/JP2015/073654, filed on Aug. 24, 2015 and JP 2014-181624, filed on Sep. 5, 2014. The entire contents of U.S. Ser. No. 15/327,422 are incorporated herein by reference.

TECHNICAL FIELD

The present technology relates to a receiving device, a receiving method, a transmission device, and a transmission method. In particular, the present technology relates to a receiving device, a receiving method, a transmission device, and a transmission method for operation of various services.

BACKGROUND ART

The operation of redelivering broadcast contents, such as a program having been broadcasted via terrestrial broadcasting, via a cable television (CATV) or satellite broadcasting has been performed (see, e.g., Patent Document 1).

CITATION LIST

Patent Document

Patent Document 1: Japanese Patent Application Laid-Open No. 2001-136444

SUMMARY OF THE INVENTION

Problems to be Solved by the Invention

Meanwhile, in the case where the broadcast contents such as the program having been broadcasted via terrestrial broadcasting are redelivered via the cable television etc., a mechanism defined in terrestrial broadcasting might not be able to be maintained in redelivery via the cable television etc. In this case, there is a probability that a service similar to that of terrestrial broadcasting cannot be provided to a receiver, and for this reason, the technique of operating various services has been demanded under redelivery environment.

The present technology has been made in view of the above-described situation, and allows operation of various services.

Solutions to Problems

A receiving device of a first aspect of the present technology includes: an acquiring unit configured to acquire trigger information for providing various functions, the trigger information containing type information indicating a type of the trigger information and channel information indicating a series for each function provided by the trigger information; and a processing unit configured to perform processing corresponding to each function on the basis of the trigger information identified by the type information and the channel information.

The receiving device of the first aspect of the present technology may be an independent device or an internal block forming a single device. Moreover, the receiving method of the first aspect of the present technology is a receiving method corresponding to the above-described receiving device of the first aspect of the present technology.

In the receiving device and the receiving method according to the first aspect of the present technology, the trigger information for providing various functions is acquired, the trigger information containing the type information indicating the type of trigger information and the channel information indicating a series for each function provided by the trigger information. Moreover, the processing corresponding to each function is performed on the basis of the trigger information identified by the type information and the channel information.

A transmission device of a second aspect of the present technology includes: a generation unit configured to generate trigger information for providing various functions, the trigger information containing type information indicating a type of the trigger information and channel information indicating a series for each function provided by the trigger information; and a sending unit configured to send the generated trigger information.

The transmission device of the second aspect of the present technology may be an independent device or an internal block forming a single device. Moreover, the transmission method of the second aspect of the present technology is a transmission method corresponding to the above-described transmission device of the second aspect of the present technology.

In the transmission device and the transmission method according to the second aspect of the present technology, the trigger information for providing various functions is generated, the trigger information containing the type information indicating the type of trigger information and the channel information indicating a series for each function provided by the trigger information. Moreover, the generated trigger information is sent.

Effects of the Invention

According to the first and second aspects of the present technology, various services can be operated.

Note that advantageous effects are not limited to those described herein, and may be any advantageous effects described in the present disclosure.

BRIEF DESCRIPTION OF DRAWINGS

FIG. 3 is a table of the configuration of the trigger information.

FIG. 4 is a table of the types of trigger information according to command IDs.

FIG. 6 is a table of an example of syntax of a TLT.

FIG. 7 is a view of the configuration of SCS trigger information.

FIG. 10 is a view of the configuration of ESG trigger information.

FIG. 13 is a view of the configuration of EAD trigger information.

FIG. 16 is a view of the configuration of RRD trigger information.

MODE FOR CARRYING OUT THE INVENTION

An embodiment of the present technology will be described below with reference to drawings. Note that description will be made in the following order.

1. Summary of Digital Broadcasting by IP Transmission Method

2. Summary of Control Using Trigger Information

3. Specific Use Cases (1) Use Case 1: SCS Trigger Information (2) Use Case 2: ESG Trigger Information (3) Use Case 3: EAD Trigger Information (4) Use Case 4: RRD Trigger Information 4. System Configuration 5. Flow of Processing Executed by Each Device 6. Computer Configuration <1. Summary of Digital Broadcasting by IP Transmission Method>

According to digital broadcasting standards in each country, a Moving Picture Experts Group phase 2-Transport Stream (MPEG2-TS) method is employed as a transmission method. However, it is assumed that in the future, introduction of an IP transmission method using, for digital broadcasting, an Internet protocol (IP) packet used in the communications field provides a higher-level service. In particular, according to Advanced Television Systems Committee (ATSC) 3.0 as currently-planning next-generation broadcasting standards in the United States of America, it is expected that the digital broadcasting using the IP transmission method is employed.

(System Pipe Model)

Figure 1:
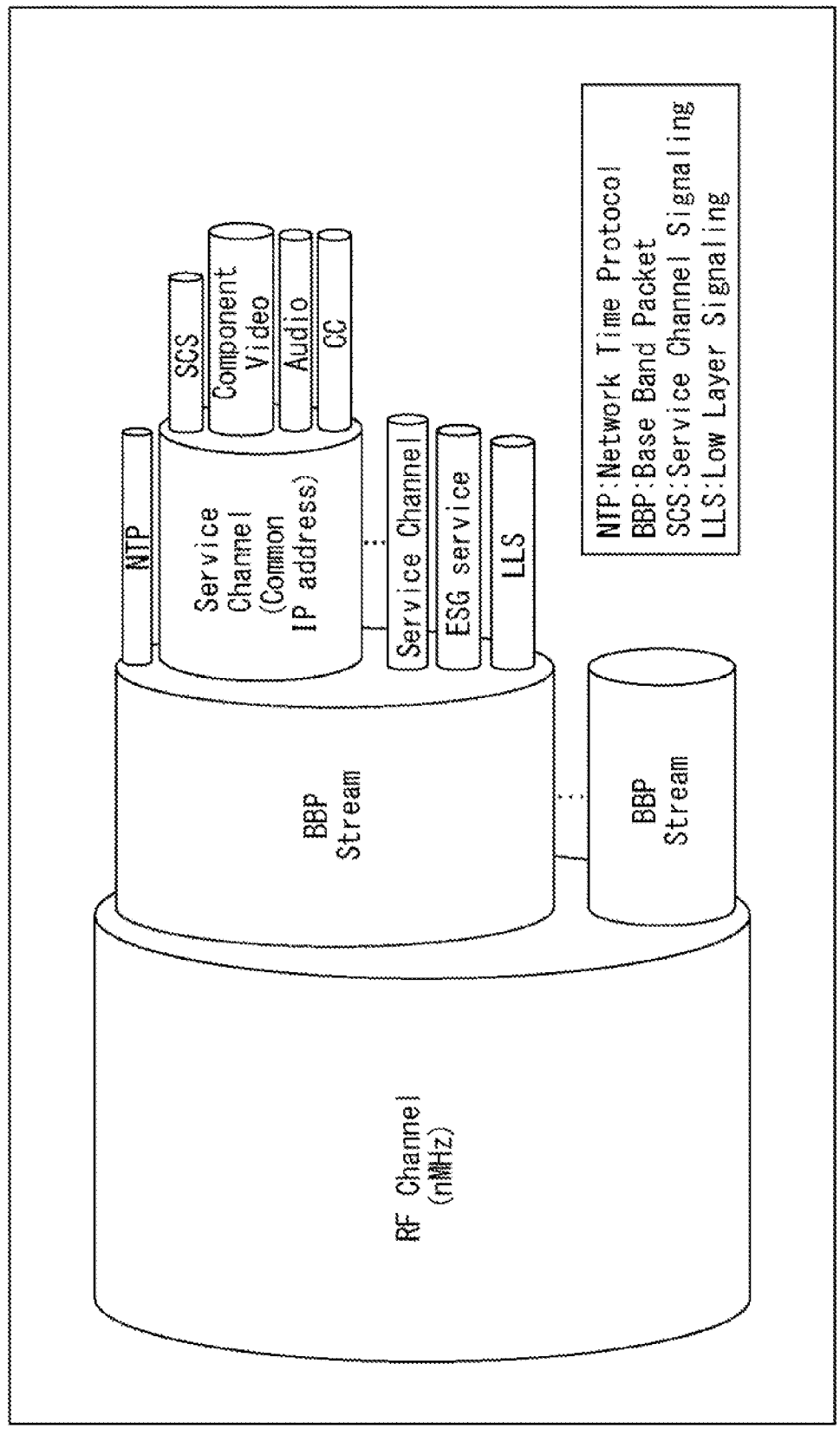
FIG. 1 is a diagram of a system pipe model of digital broadcasting employing an IP transmission method.

FIG. 1 is a diagram of a system pipe model of the digital broadcasting employing the IP transmission method.

In FIG. 1, a plurality of base band packet (BBP) streams are transmitted to a broadcast wave (RF Channel) having a predetermined frequency band. Moreover, each BBP stream contains a network time protocol (NTP), a plurality of service channels (Service Channel), an electronic service guide (ESG) service, and a low layer signaling (LLS). Note that the NTP, the service channels, and the ESG service are transmitted according to a protocol of User Datagram Protocol/Internet Protocol (UDP/IP), but the LLS is transmitted on the BBP stream.

The NTP is time information. The ESG service is an electronic service guide (an electronic program listing). Low-layer signaling information is transmitted as the LLS. For example, LLS signaling information such as service configuration description (SCD), emergency altering description (EAD), and region rating description (RRD) is transmitted as the LLS.

The SCD indicates a BBP stream configuration and a service configuration in a broadcasting network by an ID system corresponding to the above-described MPEG2-TS method. Moreover, the SCD contains, for example, attribute/setting information per service unit and bootstrap information for connection to the ESG service and a SCS.

The EAD contains information on an emergency announcement (an emergency notification). The RRD contains rating information. Note that the LLS signaling information such as the SCD is written in a markup language such as an extensible markup language (XML).

Each service channel (hereinafter sometimes referred to as a "service") includes a service channel signaling (SCS) and components (Component) forming a program (broadcast contents), such as video, audio, and a subtitle. Note that a common IP address is provided to elements forming each service, and this IP address can be used for packaging of the components, the SCS, etc. for each service.

Signaling information per service unit is transmitted as the SCS. For example, SCS signaling information such as user service description (USD), media presentation description (MPD), a session description protocol (SDP), file delivery description (FDD), service parameter description (SPD), and an initialization segment (IS) is transmitted as the SCS.

The USD contains reference information for referring to the SCS signaling information such as the MPD, the FDD, and the SDP. Note that the USD is sometimes referred to as user service bundle description (USBD). The MPD contains information such as a segment uniform resource locator (URL) for each stream of the components to be transmitted per service unit. Note that the MPD conforms to standards of Moving Picture Expert Group-Dynamic Adaptive Streaming over HTTP (MPEG-DASH). The SDP contains, for example, a service attribute per service unit, stream configuration information, a stream attribute, filter information, and location information.

The FDD contains, as index information for each transport session identifier (TSI) in a file delivery over unidirectional transport (FLUTE) session, information such as location information (e.g., a URL) and a transport object identifier (TOI). Here, in the FLUTE session, e.g., a file to be sent is managed as a single object by the TOI. Moreover, a group of a plurality of objects is managed as a single session by the TSI.

That is, in the FLUTE session, a particular file can be specified by two identification information types of TSI and TOI. Note that the FDD may be contained as an element in the USD. Moreover, instead of the FLUTE, FLUTE+ (FLUTE plus) acquired by extension of the FLUTE may be used.

The SPD is configured to contain various parameters defined at a service or component level. The IS contains control information on segment data of the video and audio components to be transmitted in the FLUTE session.

That is, in the case of transmitting the video and audio components in the FLUTE session, these component files are divided into segments, and each segment includes an initialization segment (IS) and a media segment (MS). The IS contains initialization information and control information such as a data compression method. Moreover, data of the video and audio components is stored in the MS. Note that each segment of the FLUTE session conforms to standards of an ISO base media file format.

Note that the SCS signaling information such as the USD and the MPD is written in a markup language such as an XML. Moreover, when the LLS signaling information and the SCS signaling information do not need to be distinguished from each other, these types of information will be simply referred to as "signaling information" in description.

Here, for each broadcaster, an RF channel ID (RF Channel ID) is assigned to the broadcast wave (RF Channel) having the predetermined frequency band, for example. Moreover, a BBP stream I.D (BBP Stream ID) is assigned to one or more BBP streams to be transmitted via each broadcast wave. Further, a service ID (Service ID) is assigned to one or more services to be transmitted via each BBP stream.

A configuration corresponding to a combination (a triplet (Triplet)) of a network ID (Network ID), a transport stream ID (Transport Stream ID), and a service ID (Service ID) used in the MPEG2-TS method is employed as the ID system of the IP transmission method, and the BBP stream configuration and the service configuration in the broadcasting network are indicated by the triplet.

Using this ID system, matching with the current widespread MPEG2-TS method can be achieved. Note that in the ID system of the IP transmission method, the RF channel ID and the BBP stream ID correspond respectively to the network ID and the transport stream ID in the MPEG2-TS method.

<2. Summary of Control Using Trigger Information>
(Summary of Control Using Trigger Information)
FIG. 2 is a diagram for describing a summary of control using trigger information.

In the control using the trigger information according to the present technology, video data of video-audio data forming broadcast contents as a service (Service) to be delivered from a transmitter (a later-described transmission device 10) is delivered with the trigger information (Trigger) for providing various functions being contained in the video data. With such a configuration, processing is performed according to various functions on the basis of the trigger information in a receiver (a later-described receiving device 20).

Figure 2:
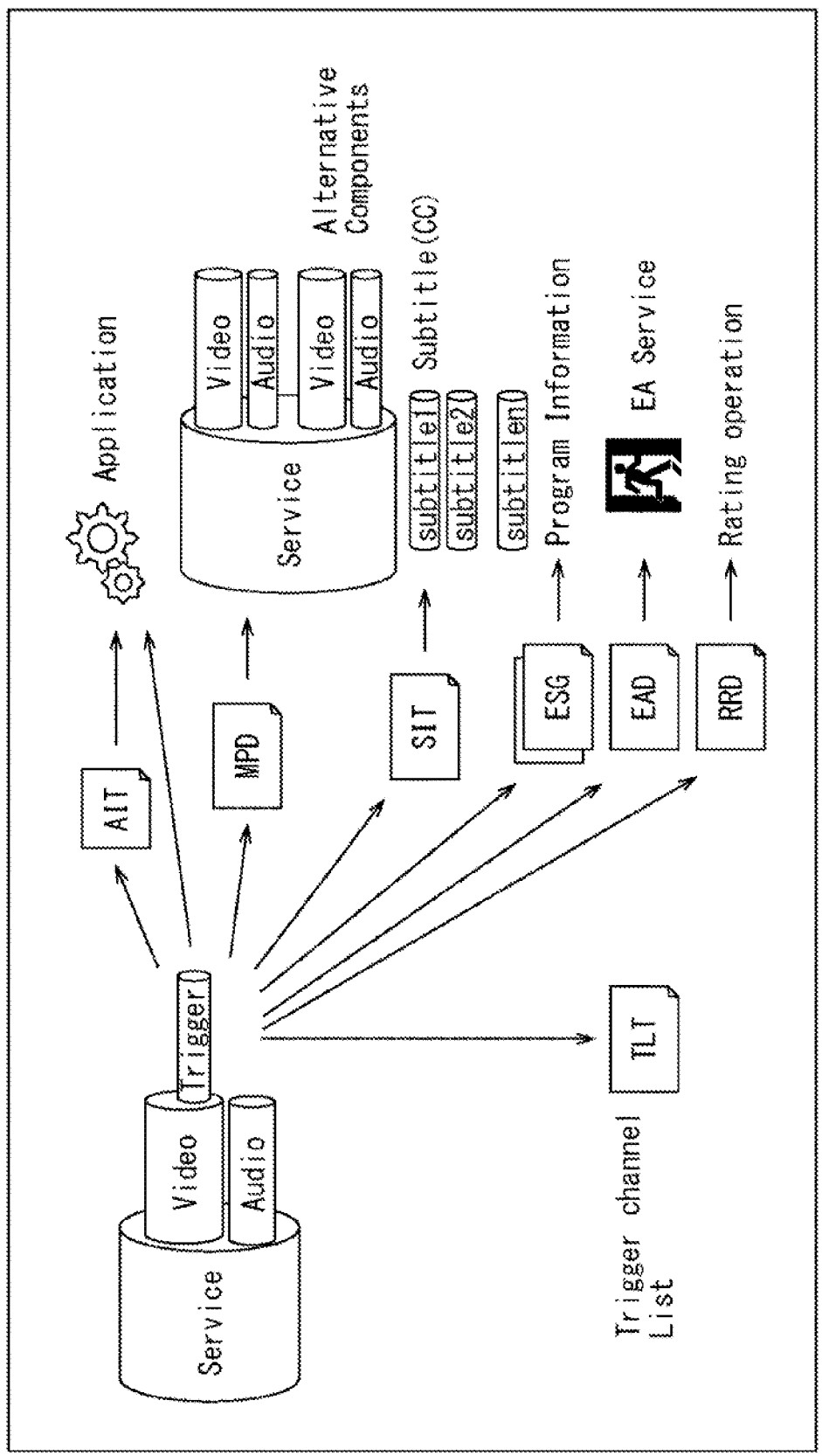
FIG. 2 is a diagram for describing a summary of control using trigger information.

In FIG. 2, when the receiver acquires the trigger information (hereinafter referred to as "application trigger information") for providing a function for an application, an application information table (AIT) is acquired on the basis of the trigger information so that operation of an application (hereinafter simply referred to as an "application") to be executed in association with the broadcast contents can be controlled. Note that the AIT is application control information acquired from, e.g., a server on the Internet.

Moreover, when the receiver acquires the trigger information (hereinafter referred to as "SCS trigger information") for providing a function for SCS signaling information, e.g., MPD is acquired on the basis of the trigger information so that video data and audio data (Alternative Components) as communication contents can be adaptively output.

When the receiver acquires the trigger information (hereinafter referred to as "subtitle trigger information") for providing a function for a subtitle, subtitle information such as a subtitle information table (SIT) is acquired on the basis of the trigger information so that the subtitle displayed overlapping with the broadcast contents can be controlled. Note that the SIT is information for controlling the subtitle. When the receiver acquires the trigger information (hereinafter referred to as "ESG trigger information") for providing a function for an electronic program listing, ESG information is acquired on the basis of the trigger information so that the processing for the electronic program listing can be performed.

Further, when the receiver acquires the trigger information (hereinafter referred to as "EAD trigger information") for providing a function for an emergency announcement service, EAD information is acquired on the basis of the trigger information so that the processing for the emergency announcement service can be performed. When the receiver acquires the trigger information (hereinafter referred to as "RRD trigger information") for providing a function for content viewing restriction (rating information), RRD information is acquired on the basis of the trigger information so that the processing for the viewing restriction can be performed.

Note that when the receiver acquires the trigger information (hereinafter referred to as "TLT trigger information") for acquiring a trigger list table (TLT), TLT information is acquired on the basis of the trigger information so that the trigger information can be acquired after the type of currently-transmitted trigger information has been recognized. Note that it can be said that the TLT is a trigger channel list (Trigger Channel List) indicating the list of the trigger information to be transmitted for each channel (each trigger channel).

(Detailed Configuration of Trigger Information)
FIG. 3 is a table of the configuration of the trigger information.

The trigger information has such a structure that a command ID (cmdID) as type information indicating the type of trigger information, a trigger channel ID for identifying the trigger channel via which the trigger information is transmitted, and a uniform resource identifier (URI) which is location information as a trigger information body are written.

In FIG. 3, a trigger number (N: N is an integer of equal to or greater than one) indicating the number of the types of trigger information is specified as three-bit number_of_trigger. A trigger map number (M: M is an integer of equal to or greater than one) indicating the number of maps of the trigger information is specified as four-bit trigger_map_number. A flag indicating whether or not the name of the trigger information is placed is specified as one-bit trigger_name_flag.

In a first loop with the trigger number N, channelID, cmdID, version, length, and name_length are placed for each type of the trigger information. The trigger channel ID is specified as eight-bit channelID. The trigger channel described herein indicates a series for each function provided by the trigger information, and is identified by the trigger channel ID.

The command ID is specified as eight-bit cmdID. The command ID is type information indicating the type (the category) of trigger information. Note that the command ID will be described later in detail with reference to FIG. 4. Version information for each trigger channel is specified as eight-bit version. The byte number of the trigger information is specified as eight-bit length.

In the case where trigger_name_flag is "1," the length of the name of the trigger information is specified by eight-bit name_length, and eight-bit trigger_name_byte is placed in such a loop. The name of the trigger information is specified as trigger_name_byte. In a loop with the trigger map number M, 16-bit trigger_map_bits is placed, and trigger_map_bits is a bit map indicating the trigger type currently transmitted with each bit.

In a second loop with the trigger number N, eight-bit URI_byte is placed for each type of trigger information. The URI as the trigger body is specified as URI_byte.

FIG. 4 is a table of the types of trigger information according to the command IDs.

In FIG. 4, a command ID of "0" indicates the TLT trigger information, and a server URL for delivering the TLT information is specified as a URI of such information. A command ID of "1" indicates the application trigger information, and a server URL for delivering the AIT is specified as a URI of such information. A command ID of "2" indicates the trigger information for directly controlling the application, and a server URL for delivering the application is specified as a URI of such information, for example.

A command ID of "3" indicates the SCS trigger information, and a server URL (a URL of a SCS server 40 described later) for delivering a SCS (e.g., the MPD) is specified as a URI of such information. A command ID of "4" indicates the subtitle trigger information, and a server URL for delivering the subtitle information is specified as a URI of such information. A command ID of "5" indicates the ESG trigger information, and a server URL (a URL of an ESG server 50 described later) for delivering the ESG information is specified as a URI of such information.

A command ID of "6" indicates the EAD trigger information, and a server URL (a URL of an EAD server 60 described later) for delivering EAD is specified as a URI of such information. A command ID of "7" indicates the RRT trigger information, and a server URL (a URL of an RRD server 70 described later) for delivering a RRT is specified as a URI of such information. A command ID of "8" indicates the trigger information corresponding to preference demographic and interest (PDI), and a server URL for delivering the PDI is specified as a URI of such information. Note that the PDI has such a mechanism that information indicating a user's response to an inquiry from a provider server is generated so as to reproduce (accumulate) only contents matching with a user's preference.

A command ID of "9" indicates the trigger information corresponding to viewing data (a viewing history), and a server URL of a forwarding destination of the viewing data is specified as a URI of such information. A command ID of "10" indicates the trigger information (hereinafter referred to as "MPD reference trigger information") containing a URL for MPD reference, and the URL for MPD reference is specified as a URI of such information. That is, the URL is specified, which indicates an acquisition destination of (streams of) components forming the broadcast contents indicated by the URL written in the MPD acquired according to the trigger information with a command ID of "3". Accordingly, of the URL written in the MPD, a URL other than the URL for MPD reference is a URL indicating an acquisition destination of (streams) of components forming the communication contents.

(Details of Trigger Channel)

The trigger channel represents a series (a sequence) of particular functions provided by the trigger information. The trigger channel varies according to the trigger information type identified by the command ID. However, even for the same type of trigger information, several trigger channels may be used for transmission.

For example, for the application trigger information, a channel for control of an application provided by an original content provider and a channel for control of an application provided by a broadcaster may be provided. Moreover, for the subtitle trigger information, channels may be provided separately for languages (e.g., English and Spanish) or purposes (e.g., for people with visual impairment).

Figure 5:
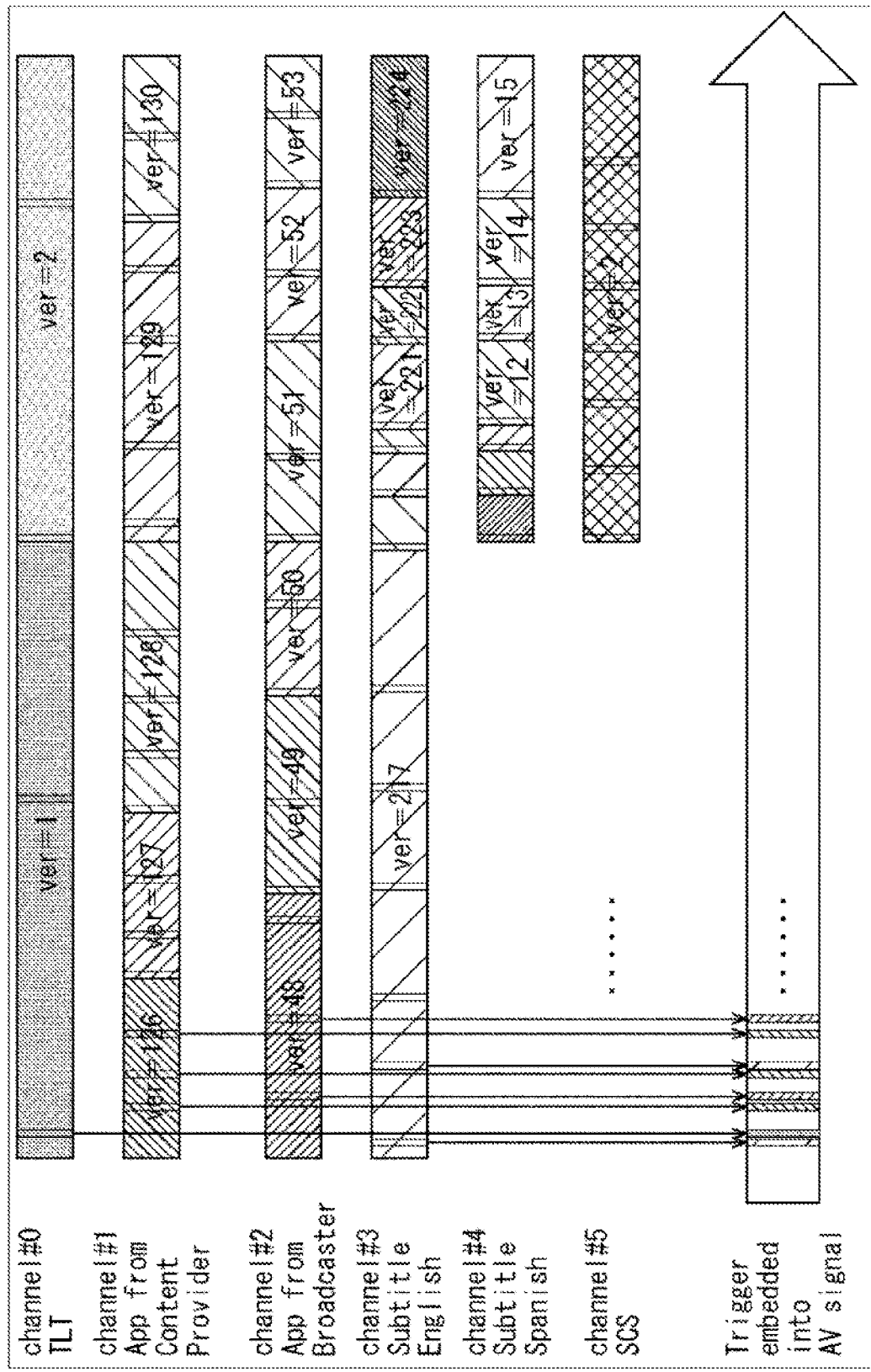
FIG. 5 is a schematic diagram of the concept of a trigger channel.

FIG. 5 is a schematic chart of the concept of the trigger channel. Note that in FIG. 5, a direction from the left side to the right side as viewed in the figure is the direction of passage of time. Moreover, a lower arrow as viewed in the figure indicates the broadcast contents (an AV signal), and the trigger information to be transmitted via each trigger channel is embedded in the video data of the broadcast contents.

In FIG. 5, a channel #0 is a channel for transmitting the TLT trigger information. A channel #1 is a channel for transmitting the application trigger information for control of the application provided by the original content provider (Content Provider). Moreover, a channel #2 is a channel for transmitting the application trigger information for control of the application provided by the broadcaster (Broadcaster).

A channel #3 is a channel for transmitting the subtitle trigger information for control of an English subtitle (English). Moreover, a channel #4 is a channel for transmitting the subtitle trigger information for control of a Spanish subtitle (Spanish). A channel #5 is a channel for transmitting the SCS trigger information. Note that although not illustrated in FIG. 5, other types of trigger information such as the ESG trigger information, the EAD trigger information, and the RRD trigger information are also transmitted via channels such as channels #6, #7, #8.

Moreover, the version information is specified for each trigger channel. In each trigger channel, the trigger information with the same contents is repeatedly transmitted as necessary, and when such contents are updated, the version information is rewritten. For example, in the channel #0, the TLT trigger information with version information of "1" is repeatedly transmitted, and then, the TLT trigger information with version information of "2" is repeatedly transmitted.

While various types of trigger information are being momentarily transmitted in each of the plurality of trigger channels, filtering is, in the receiver, performed according to the channel ID and the version information contained in the trigger information, and in updating of the trigger information, such trigger information is taken only once for the trigger channel via which the trigger information on a required function is transmitted. For example, in FIG. 5, although the application trigger information with version information of "126" is repeatedly transmitted in the channel #1, only the first application trigger information with the version information of "126" is acquired in the receiver, and the subsequent application trigger information with the version information of "126" is ignored.

(Example of Syntax of TLT)

FIG. 6 is a table of an example of syntax of the TLT. The TLT is written in a markup language such as an XML. Note that in FIG. 6, "0" is assigned to an attribute of an element/attribute. Moreover, an indented element/attribute is specified for a higher-order element.

Moreover, for an occurrence rate (Cardinality) in FIG. 6, only one element or attribute is always specified in the case of "1," and it is optional whether or not the element or attribute is specified in the case of "0 . . . 1." Moreover, in the case of "1 . . . n," one or more elements or attributes are specified.

In FIG. 6, a TriggerChannel element indicates one or more trigger channels. Each TriggerChannel element includes a ChannelID attribute, a cmdID attribute, a version attribute, and a name attribute. The trigger channel ID is specified as the ChannelID attribute. The command ID is specified as the cmdID attribute. The version information for each trigger channel is specified as the version attribute. The name of the trigger information is specified as the name attribute.

Note that the configuration of the syntax of the TLT shown in FIG. 6 is an example, and other configurations may be employed.

<3. Specific Use Cases>

(1) Use Case 1: SCS Trigger Information (Configuration of SCS Trigger Information)

FIG. 7 is a view of the configuration of SCS trigger information.

In FIG. 7, the SCS trigger information has such a structure that header information such as a channel ID, a command ID, and version information and a URI which is location information (locator part) as a trigger information body are written. An ID identifying a trigger channel via which the SCS trigger information is transmitted is specified as the channel ID. In the case of the SCS trigger information, "3" is specified as the command ID. Moreover, a server URL (e.g., a URL of a SCS server 40 described later with reference to FIG. 8 etc.) for delivering MPD information as a SCS is specified as the location information.

Media time information (media_time) is specified as terms. Time information for reference in MPD is specified as the media time information. Moreover, spread information (spread), version information (version), or other parameters (others) can be optionally specified as the terms. Information for stochastically distributing operation for the MPD is specified as the spread information. Version information of the MPD is specified as the version information. Note that in the SCS trigger information, these parameters are coupled together with "&."

(Use Case 1)

Figure 8:
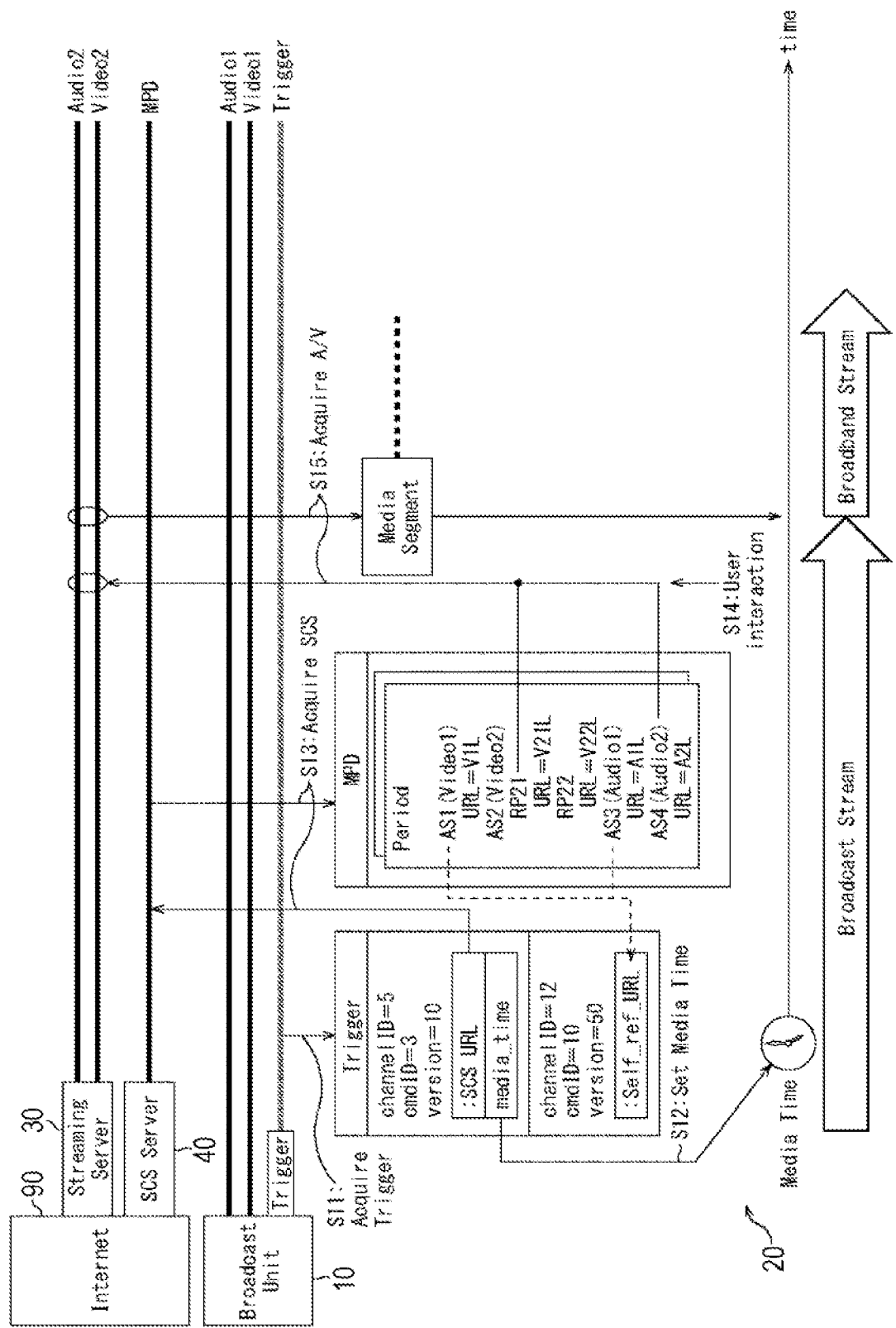
FIG. 8 is a chart for describing a use case 1.

FIG. 8 is a chart for describing a use case 1. Note that in FIG. 8, each processing step executed by a receiving device 20 placed at, e.g., each home is shown, and the direction of passage of time is a direction from the left side to the right side as viewed in the figure. Note that these relationships are similarly applied to other figures described later.

In FIG. 8, a transmission device 10 of a broadcast station (a broadcaster) identified by an RF channel ID transmits, via a digital broadcast signal (Broadcast Signal) using an IP transmission method, a BBP stream identified by a BBP stream ID. Streams of components (Audio1/Video1) forming broadcast contents delivered as a service identified by a service ID and a stream of signaling information (not shown) are transmitted via the BBP stream. Note that files transmitted via these streams are transmitted in a FLUTE session.

Moreover, in FIG. 8, a streaming server 30 and a SCS server 40 are provided on the Internet 90. The streaming server 30 is configured to deliver streams of components (Audio2/Video2) forming communication contents via the Internet 90. Moreover, the SCS server 40 is configured to deliver MPD information via the Internet 90.

In the use case 1, the broadcast contents (e.g., a program etc.) delivered from the transmission device 10 are sent. In FIG. 8, the broadcast contents are reproduced in the receiving device 20 by connection to the streams of the components (Audio1/Video1) from the transmission device 10.

At the timing at which the transmission device 10 delivers trigger information, the receiving device 20 acquires the trigger information transmitted via a video stream (S11 of FIG. 8). Such trigger information contains two trigger channels, i.e., SCS trigger information with a command ID of "3" and MPD reference trigger information with a command ID of "10." The SCS trigger information contains a channel ID, a command ID, and version information as header information, as well as containing location information (SCS URL) and media time information (media_time). Moreover, the MPD reference trigger information contains a channel ID, a command ID, and version information as header information, as well as containing a URL (Self_ref_URL) for MPD reference.

The receiving device 20 sets the media time information contained in the SCS trigger information, and begins time counting on the basis of the media time information (S12 of FIG. 8). Moreover, the receiving device 20 accesses the SCS server 40 via the Internet 90 to acquire the MPD information as SCS on the basis of the location information (a URL of the SCS server 40) contained in the SCS trigger information (S13 of FIG. 8).

Here, in the MPD information (MPD) described herein, a Period element, an AdaptationSet (AS) element, and a Representation (RP) element are written in a markup language such as XML in a hierarchical structure. The Period element is a unit for writing a content configuration such as a program. Moreover, the AdaptationSet element and the Representation element are utilized for each stream such as video, audio, and a subtitle, and are for writing an attribute of each stream.

In an example of the MPD of FIG. 8, a segment URL of a stream of video 1 is written as a first AdaptationSet element (AS1). For a second AdaptationSet element (AS2), a segment URL of a stream of video 2 is written as a Representation element which is a subelement of the second AdaptationSet element. Moreover, a segment URL of a stream of audio 1 is written as a third AdaptationSet element (AS3), and a segment URL of a stream of audio 2 is written as a fourth AdaptationSet element (AS4).

In this example, it can be seen that the segment URLs of the video 1 and the audio 1 in the MPD match with the URL (Self_ref_URL) contained in the MPD reference trigger information, and therefore, these streams are transmitted as broadcast streams. Moreover, the streams of the components corresponding to the MPD's segment URLs not matching with the URL (Self_ref_URL) contained in the MPD reference trigger information are transmitted via communication, and therefore, the streams of the video 2 and the audio 2 are transmitted as communication streams.

Then, for example, in the case of providing a multi-view service, when a user switches a displayed indication from a main view to a sub-view (S14 of FIG. 8), the receiving device 20 accesses the streaming server 30 via the Internet 90 according to the segment URLs of the video 2 and the audio 2 of the MPD, and then, the streams of the components (Audio2/Video2) forming the communication contents are acquired (S15 of FIG. 8). In this manner, the displayed program is, during reproduction thereof, switched from a main view of the broadcast streams to a sub-view of the communication streams in the receiving device 20.

Note that in reproduction of the components (Audio2/Video2) forming the communication contents, these components are, by reference to the media time information set by the processing of step S12, reproduced according to a relative time with reference to the beginning of the program, for example.

Note that in FIG. 8, the trigger information is regularly delivered from the transmission device 10. In the receiving device 20, the version information of the header information contained in the SCS trigger information is monitored, and when the contents of the SCS trigger information are updated, such SCS trigger information is acquired, for example. Thus, in the receiving device 20, the processing of setting the media time information contained in the new SCS trigger information to adjust the counted time is performed, for example.

(Use Case 1 in ACR Handling)

Figure 9:
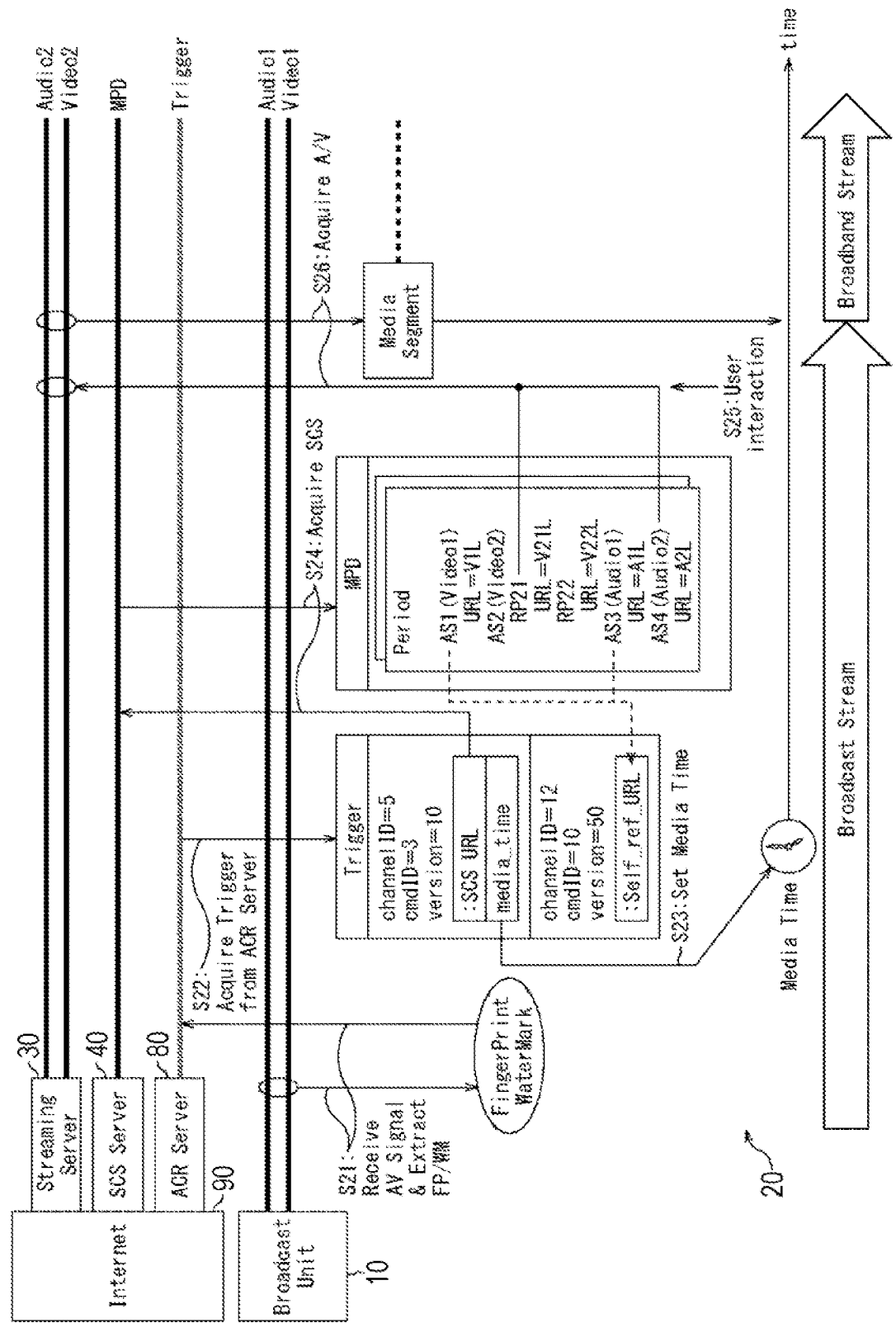
FIG. 9 is a chart for describing the use case 1 in ACR handling.

FIG. 9 shows the case where in the use case 1 shown in FIG. 8, the trigger information is not delivered from the transmission device 10, but is delivered by an ACR server 80.

In FIG. 9, a transmission device 10 of a broadcast station (a broadcaster) transmits, as in FIG. 8 described above, a BBP stream via a digital broadcast signal using an IP transmission method. Streams of components etc. (Audio1/Video1) forming broadcast contents to be delivered as a service are transmitted via the BBP stream.

Moreover, in FIG. 9, the ACR server 80 is provided on the Internet 90, in addition to a streaming server 30 and the SCS server 40. The streaming server 30 is configured to deliver streams of components (Audio2/Video2) forming communication contents via the Internet 90. Moreover, the SCS server 40 is configured to deliver MPD information via the Internet 90.

The ACR server 80 is configured to identify, in response to an inquiry from a receiving device 20, contents using an automatic content recognition (ACR) technique to deliver the trigger information corresponding to such an identification result via the Internet 90.

In FIG. 9, the broadcast contents (e.g., a program) from the transmission device 10 are, in the receiving device 20, reproduced by connection to the streams of the components (Audio1/Video1) forming the broadcast contents.

The receiving device 20 sends a feature value (hereinafter referred to as "finger print information" (Finger Print)) to the ACR server 80 via the Internet 90, the feature value being extracted from at least one of video data and audio data of the contents during reproduction thereof (S21 of FIG. 9). Note that the finger print information is sent from the receiving device 20 to the ACR server 80 in a cycle of several seconds, for example.

When receiving the finger print information from the receiving device 20, the ACR server 80 checks the finger print information against a database to identify, using the ACR technique, the contents reproduced in the receiving device 20. Then, the ACR server 80 generates the trigger information corresponding to such an identification result. The ACR server 80 sends the trigger information corresponding to the ACR identification result to the receiving device 20 via the Internet 90.

Note that in this example, water mark information (Water Mark) may be used instead of the finger print information. In the case of using the water mark information, information identifying a scene of the program can be contained. Thus, in this case, the ACR server 80 does not need to identify the scene of the program.

Then, the receiving device 20 acquires (receives), via the Internet 90, the trigger information sent from the ACR server 80 (S22 of FIG. 9). Such trigger information contains two trigger channels, i.e., SCS trigger information with a command ID of "3" and MPD reference trigger information with a command ID of "10." The SCS trigger information contains a channel ID, a command ID, and version information as header information, as well as containing location information (SCS URL) and media time information (media_time). Moreover, the MPD reference trigger information contains a channel ID, a command ID, and version information as header information, as well as containing a URL (Self_ref_URL) for MPD reference.

Subsequently, the processing of steps S23 to S26 corresponding to the above-described processing of steps S12 to S15 of FIG. 8 is executed in the receiving device 20. That is, in the receiving device 20, time counting using the media time information contained in the SCS trigger information begins, and the MPD information is acquired from the SCS server 40 via the Internet 90 (S23, S24 of FIG. 9). Then, when a user switches a displayed indication from a main view to a sub-view (S25 of FIG. 9), the receiving device 20 accesses the streaming server 30 via the Internet 90 on the basis of MPD, and then, acquires the streams of the components (Audio2/Video2) forming the communication contents (S26 of FIG. 9). In this manner, the displayed program is, during reproduction thereof, switched from a main view of broadcast streams to a sub-view of communication streams in the receiving device 20.

Note that when sending the finger print information to the ACR server 80, the receiving device 20 may request the SCS trigger information and the MPD reference trigger information. In this manner, the receiving device 20 can acquire the SCS trigger information etc. at the timing requiring the MPD, and can acquire the MPD information from the SCS server 40, for example.

The use case 1 has been described above. In the use case 1, the SCS trigger information for providing a function for SCS signaling information and the MPD reference trigger information containing the URL for MPD reference are delivered to the receiving device 20. In this manner, various services such as reproduction of the communication contents can be provided to the receiving device 20. Moreover, the MPD information is also acquired via communication. Thus, even when the MPD information cannot be acquired via broadcasting, the MPD information can be reliably acquired via communication, and as a result, the communication contents can be reproduced.

(2) Use Case 2: ESG Trigger Information (Configuration of ESG Trigger Information)

FIG. 10 is a view of the configuration of ESG trigger information.

In FIG. 10, the ESG trigger information has such a structure that header information such as a channel ID, a command ID, and version information and a URI which is location information (locator part) as a trigger information body are written. An ID identifying a trigger channel via which the ESG trigger information is transmitted is specified as the channel ID. In the case of the ESG trigger information, "5" is specified as the command ID. Moreover, a server URL (e.g., a URL of an ESG server 50 described later with reference to FIG. 11 etc.) for delivering ESG information is specified as the location information.

A program ID (ProgramID) is specified as terms. An ID identifying a current program is specified as the program ID. Moreover, scope information (scope), spread information (spread), version information (version), or other parameters (others) can be optionally specified as the terms.

A number (number: the number of programs) indicating the number of programs for which the ESG information is acquired after the current program can be specified as the scope information. For example, when "1" is specified as the scope information, only an ESG for the current program is acquired. When "2" is specified, the ESG information for the current program and a subsequent program is acquired. Since the program number (the number of programs) is specified as the scope information as described above, the ESG information for the program(s) after the current program can be acquired in a receiving device 20. Information for stochastically distributing operation for the ESG is specified as the spread information. The version information of the ESG is specified as the version information.

(Use Case 2)

Figure 11:
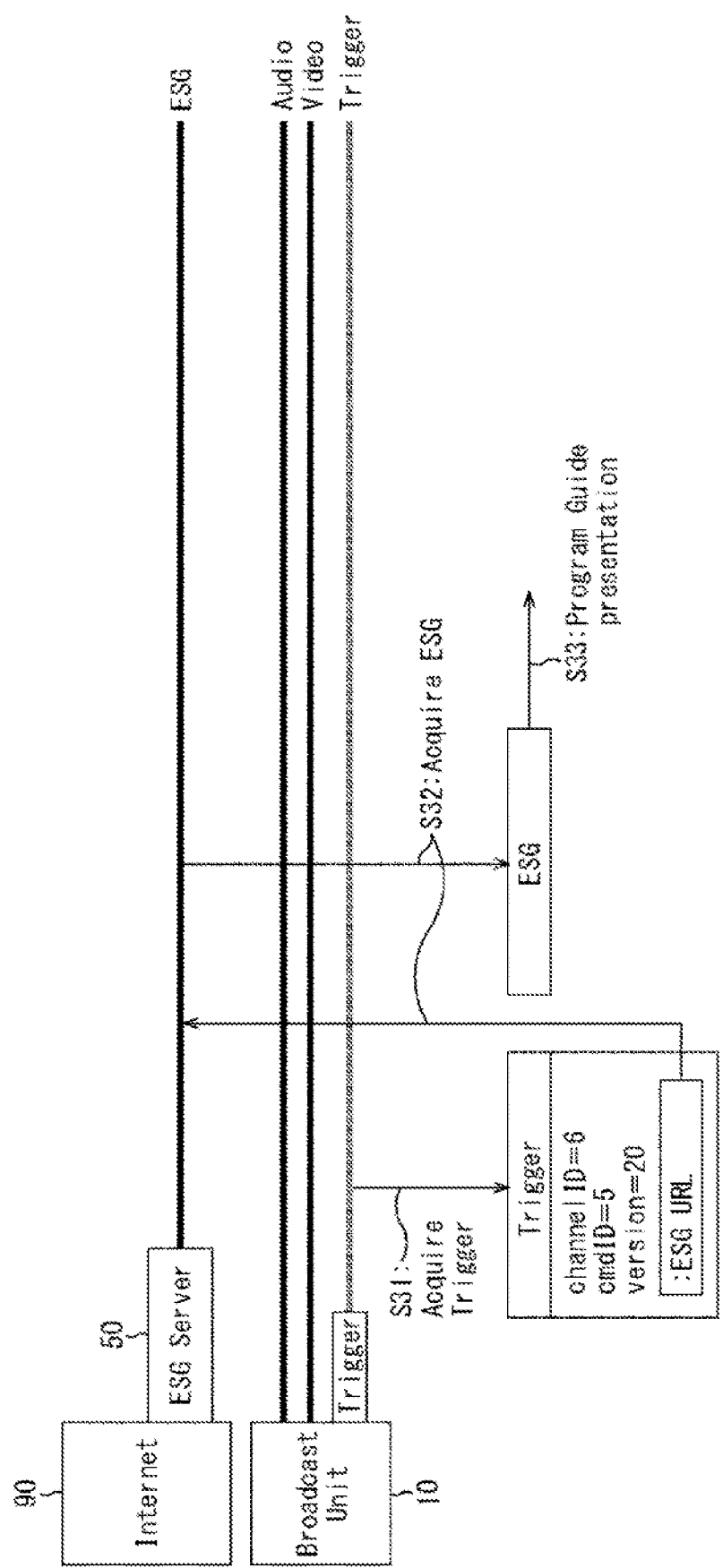
FIG. 11 is a chart for describing a use case 2.

FIG. 11 is a chart for describing a use case 2.

In FIG. 11, a transmission device 10 of a broadcast station (a broadcaster) identified by an RF channel ID transmits, via a digital broadcast signal (Broadcast Signal) using an IP transmission method, a BBP stream identified by a BBP stream ID. Streams of components (Audio/Video) forming broadcast contents delivered as a service identified by a service ID and a stream of signaling information (not shown) are transmitted via the BBP stream.

Moreover, in FIG. 11, an ESG server 50 is provided on the Internet 90. The ESG server 50 is configured to deliver ESG information via the Internet 90.

In FIG. 11, the broadcast contents (e.g., a program) from the transmission device 10 are reproduced in a receiving device 20 by connection to the streams of the components (Audio/Video) forming the broadcast contents.

At the timing at which the transmission device 10 delivers trigger information, the receiving device 20 acquires the trigger information transmitted via a video stream (S31 of FIG. 11). Such trigger information is ESG trigger information with a command ID of "5". The ESG trigger information contains a channel ID, a command ID, and version information as header information, as well as containing location information (ESG URL).

The receiving device 20 accesses the ESG server 50 via the Internet 90 on the basis of the location information (the URL of the ESG server 50) contained in the ESG trigger information, and then, acquires the ESG information (S32 of FIG. 11). The receiving device 20 displays the ESG information acquired by the processing of step S32 (S33 of FIG. 11). For example, on the basis of the ESG information, the receiving device 20 can display a title or logo of a current program, or can display detailed information on the current program according to user's operation.

Note that in FIG. 11, the trigger information is regularly delivered from the transmission device 10. In the receiving device 20, the version information of the header information contained in the ESG trigger information is monitored, and when the contents of the ESG trigger information are updated, such ESG trigger information is acquired, for example. Thus, in the receiving device 20, the processing of displaying the ESG information acquired from the new ESG trigger information is performed, for example. Moreover, when terms of the ESG trigger information include scope information, the ESG information for a program(s) after the current program is, in the receiving device 20, acquired according to a program number (the number of programs) specified by the scope information, and then, information corresponding to such ESG information is displayed.

(Use Case 2 in ACR Handling)

Figure 12:
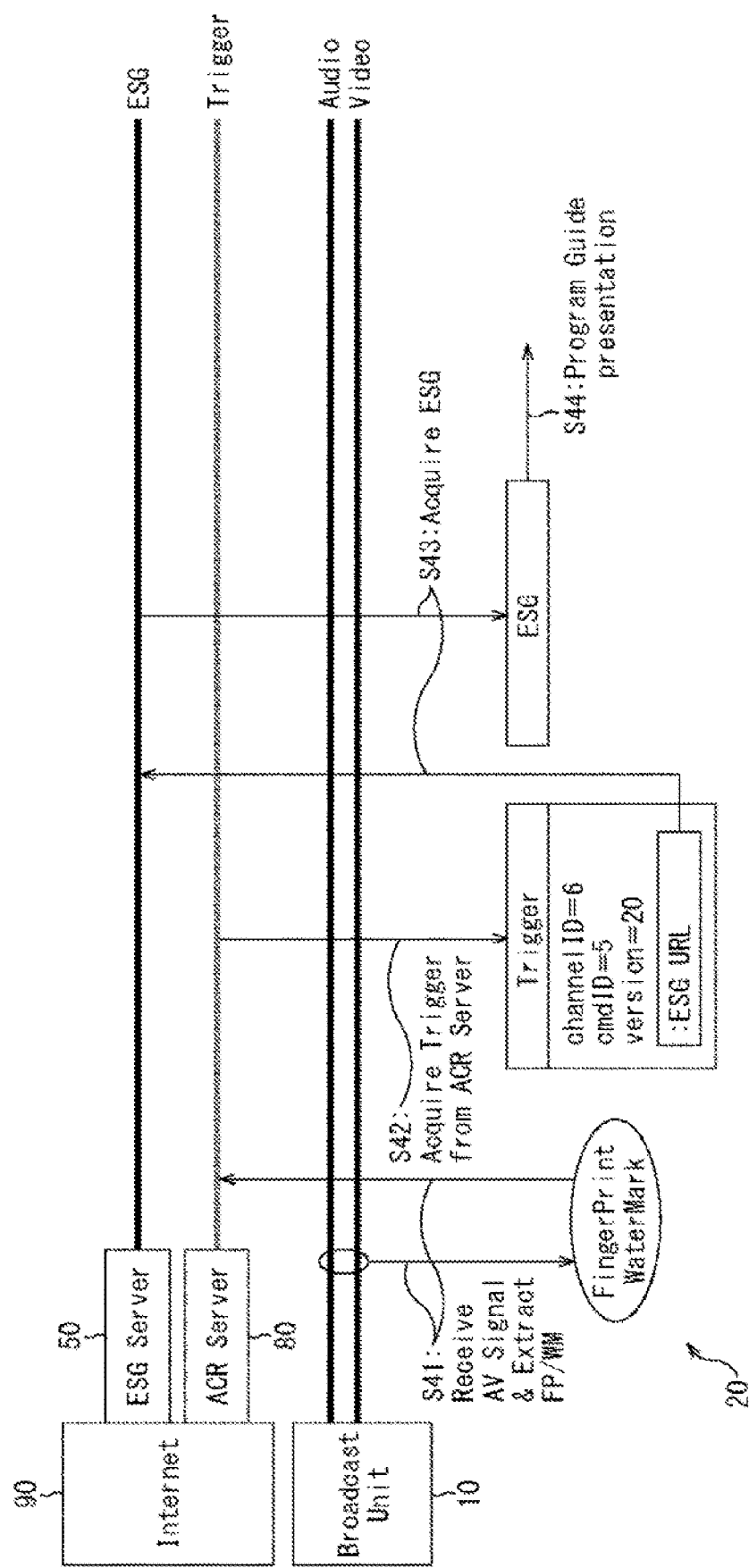
FIG. 12 is a chart for describing the use case 2 in ACR handling.

FIG. 12 shows the case where in the use case 2 shown in FIG. 11, the trigger information is not delivered from the transmission device 10, but is delivered by an ACR server 80.

In FIG. 12, a transmission device 10 of a broadcast station (a broadcaster) transmits, as in FIG. 11 described above, a BBP stream via a digital broadcast signal using an IP transmission method. Streams of components etc. (Audio/Video) forming broadcast contents to be delivered as a service are transmitted via the BBP stream.

Moreover, in FIG. 12, the ACR server 80 is provided on the Internet 90, in addition to an ESG server 50. The ACR server 80 is configured to identify, in response to an inquiry from a receiving device 20, contents using an ACR technique to deliver the trigger information corresponding to such an identification result via the Internet 90.

In FIG. 12, the broadcast contents (e.g., a program) from the transmission device 10 are, in the receiving device 20, reproduced by connection to the streams of the components (Audio/Video) forming the broadcast contents.

The receiving device 20 sends finger print information to the ACR server 80 via the Internet 90, the finger print information being extracted from at least one of video data and audio data of the contents during reproduction thereof (S41 of FIG. 12). The ACR server 80 sends the trigger information to the receiving device 20 via the Internet 90, the trigger information corresponding to the ACR identification result using the finger print information from the receiving device 20. Note that water mark information may be used instead of the finger print information.

With this configuration, the receiving device 20 acquires (receives), via the Internet 90, the trigger information sent from the ACR server 80 (S42 of FIG. 12). Such trigger information is ESG trigger information with a command ID of "5." The ESG trigger information contains a channel ID, a command ID, and version information as header information, as well as containing location information (ESG URL).

Subsequently, the processing of steps S43 to S44 corresponding to the above-described processing of steps S32 to S33 of FIG. 11 is executed in the receiving device 20. That is, in the receiving device 20, the ESG information is acquired from the ESG server 50 via the Internet 90 (S43 of FIG. 12). Then, the ESG information acquired by the processing of step S43 is displayed in the receiving device 20 (S44 of FIG. 12).

Note that when sending the finger print information to the ACR server 80, the receiving device 20 may request the ESG trigger information. In this manner, the receiving device 20 can acquire the ESG trigger information at the timing requiring the ESG information, and can acquire the ESG information from the ESG server 50, for example.

The use case 2 has been described above. In the use case 2, the ESG trigger information for providing a function for the ESG information is delivered to the receiving device 20. In this manner, various services such as display of the ESG information can be provided to the receiving device 20. Moreover, the ESG information is acquired via communication. Thus, even when the ESG information cannot be acquired via broadcasting, the ESG information can be reliably acquired via communication, and as a result, the ESG information can be displayed, for example.

(3) Use Case 3: EAD Trigger Information (Configuration of EAD Trigger Information)

FIG. 13 is a view of the configuration of EAD trigger information.

In FIG. 13, the EAD trigger information has such a structure that header information such as a channel ID, a command ID, and version information and a URI which is location information (locator_part) as a trigger information body are written. An ID identifying a trigger channel via which the EAD trigger information is transmitted is specified as the channel ID. In the case of the EAD trigger information, "6" is specified as the command ID. Moreover, a server URL (e.g., a URL of an EAD server 60 described later with reference to FIG. 14 etc.) for delivering EAD information is specified as the location information.

One or more EA messages (EA message) are specified as an option for terms. For such an EA message, an emergency message with a higher degree of urgency is specified as a message (message) identified by an EA message ID (eaMessageId). Note that the EA message ID corresponds to an ID for identifying a message contained in the BAD information. Moreover, when multiple EA messages are placed in the EAD trigger information, these EA messages (message IDs and messages) are coupled together with "&."

(Use Case 3)

Figure 14:
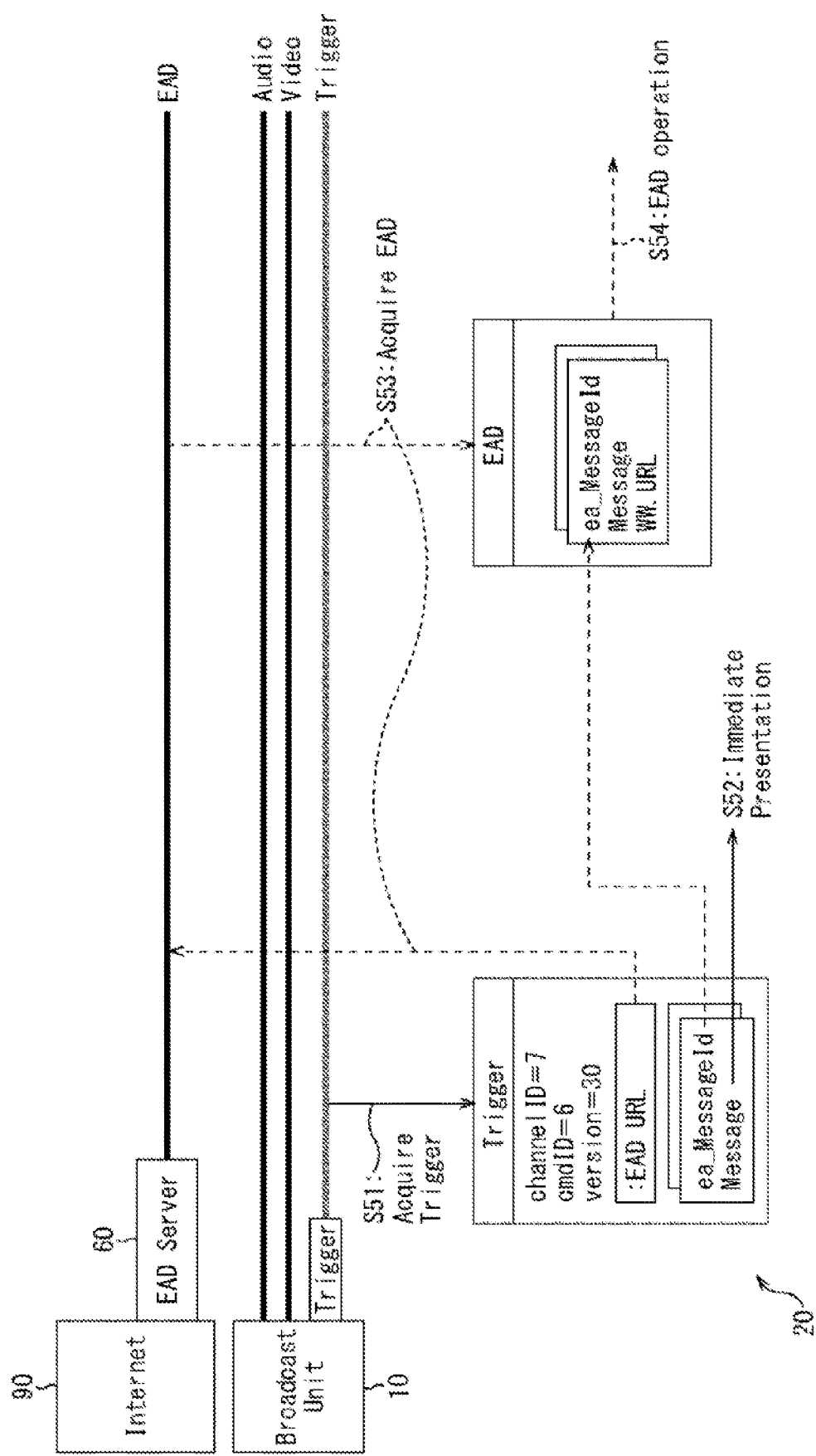
FIG. 14 is a chart for describing a use case 3.

FIG. 14 is a chart for describing a use case 3.

In FIG. 14, a transmission device 10 of a broadcast station (a broadcaster) identified by an RF channel ID transmits, via a digital broadcast signal (Broadcast Signal) using an IP transmission method, a BBP stream identified by a BBP stream ID. Streams of components (Audio/Video) forming broadcast contents delivered as a service identified by a service ID and a stream of signaling information (not shown) are transmitted via the BBP stream.

Moreover, in FIG. 14, an EAD server 60 is provided on the Internet 90. The EAD server 60 is configured to deliver EAD information via the Internet 90.

In FIG. 14, the broadcast contents (e.g., a program) from the transmission device 10 are reproduced in a receiving device 20 by connection to the streams of the components (Audio/Video) forming the broadcast contents.

At the timing at which the transmission device 10 delivers trigger information, the receiving device 20 acquires the trigger information transmitted via a video stream (S51 of FIG. 14). Such trigger information is EAD trigger information with a command ID of "6". The EAD trigger information contains a channel ID, a command ID, and version information as header information, as well as containing location information (EAD URL). Moreover, the EAD trigger information may contain, as an option, an emergency message (an EA message) with a higher degree of urgency.

In the case where the EAD trigger information contains the EA message, the receiving device 20 displays the EA message (the emergency message) such that the EA message is superimposed on a video image of the broadcast contents during reproduction thereof (S52 of FIG. 14). In this case, the emergency message can be promptly displayed in the receiving device 20 at the timing at which the EAD trigger information is acquired. Thus, a user can confirm notification contents of a message with a higher degree of urgency. Moreover, only the EAD trigger information transmitted via broadcasting is used in the receiving device 20, and therefore, the emergency message can be displayed even under the environment where connection to the Internet 90 is not available.

On the other hand, in the case where the EAD trigger information does not contain the EA message, the receiving device 20 accesses the EAD server 60 via the Internet 90 on the basis of the location information (a URL of the EAD server 60) contained in the EAD trigger information, and then, acquires the EAD information (S53 of FIG. 14). The receiving device 20 processes the EAD information acquired by the processing of step S53 (S54 of FIG. 14). For example, the receiving device 20 can display a message (Message) regarding an emergency announcement contained in the EAD information. Moreover, the receiving device 20 can access the server on the Internet 90 according to the URL (WW.URL) contained in the EAD information, and then, can acquire and display a web page regarding the emergency announcement.

Note that the case where the EAD information is acquired from the EAD server 60 when the EAD trigger information does not contain the EA message has been described above. However, the EAD information may be, in the case of containing the EA message in the EAD trigger information, acquired from the EAD server 60, and the EA message contained in the EAD trigger information and the message contained in the EAD information may be associated with each other, for example. In this case, these messages are associated with each other by an EA message ID.

Further, when the receiving device 20 requests the EAD server 60 for the EAD information, the EAD information customized for each user, such as the EAD information containing, e.g., information indicating a current position of the receiving device 20 or information indicating the age, sex, etc. of the user, may be acquired.

(Use Case 3 in ACR Handling)

Figure 15:
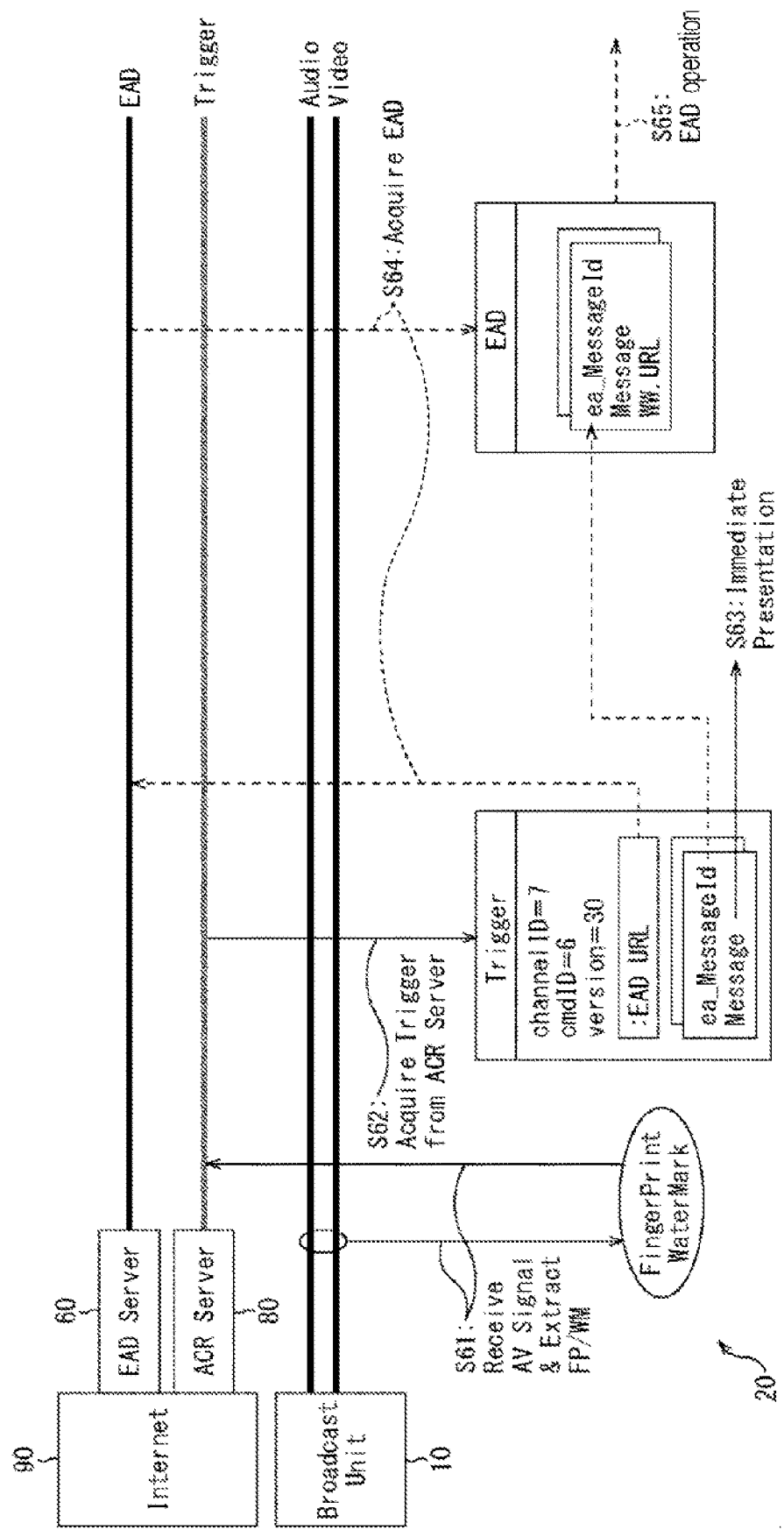
FIG. 15 is a chart for describing the use case 3 in ACR handling.

FIG. 15 shows the case where in the use case 3 shown in FIG. 14, the trigger information is not delivered from the transmission device 10, but is delivered by an ACR server 80.

In FIG. 15, a transmission device 10 of a broadcast station (a broadcaster) transmits, as in FIG. 14 described above, a BBP stream via a digital broadcast signal using an IP transmission method. Streams of components etc. (Audio/Video) forming broadcast contents to be delivered as a service are transmitted via the BBP stream.

Moreover, in FIG. 15, the ACR server 80 is provided on the Internet 90, in addition to an EAD server 60. The ACR server 80 is configured to identify, in response to an inquiry from a receiving device 20, contents using an ACR technique to deliver the trigger information corresponding to such an identification result via the Internet 90.

In FIG. 15, the broadcast contents (e.g., a program) from the transmission device 10 are, in the receiving device 20, reproduced by connection to the streams of the components (Audio/Video) forming the broadcast contents.

The receiving device 20 sends finger print information to the ACR server 80 via the Internet 90, the finger print information being extracted from at least one of video data and audio data of the broadcast contents during reproduction thereof (S61 of FIG. 15). The ACR server 80 sends the trigger information to the receiving device 20 via the Internet 90, the trigger information corresponding to the ACR identification result using the finger print information from the receiving device 20. Note that water mark information may be used instead of the finger print information.

With this configuration, the receiving device 20 acquires (receives), via the Internet 90, the trigger information sent from the ACR server 80 (S62 of FIG. 15). Such trigger information is EAD trigger information with a command ID of "6." The EAD trigger information contains a channel ID, a command ID, and version information as header information, as well as containing location information (EAD URL) and an EA message (Message) as an option.

Subsequently, the processing of steps S63 to S65 corresponding to the above-described processing of steps S52 to S54 of FIG. 14 is executed in the receiving device 20. That is, in the case of containing the EA message in the EAD trigger information, the EA message (an emergency message) is, in the receiving device 20, displayed with the message being superimposed on the broadcast components during reproduction thereof (S63 of FIG. 15). On the other hand, in the case of not containing the EA message in the EAD trigger information, the EAD information is acquired from the EAD server 60 via the Internet 90 in the receiving device 20 (S64 of FIG. 15). Then, in the receiving device 20, a message regarding an emergency announcement contained in the EAD information acquired by the processing of step S64 is displayed (S65 of FIG. 15), for example.

Note that when sending the finger print information to the ACR server 80, the receiving device 20 may request the EAD trigger information. In this manner, the receiving device 20 can acquire the EAD trigger information at the timing requiring the emergency information, and can acquire the information on the emergency announcement, for example.

The use case 3 has been described above. In the use case 3, the EAD trigger information for providing a function for the EAD information is delivered to the receiving device 20. In this manner, various services such as display of the information on the emergency announcement can be provided to the receiving device 20. Moreover, the EAD information is acquired via communication. Thus, even when the EAD information cannot be acquired via broadcasting, the EAD information can be reliably acquired via communication, and as a result, the information on the emergency announcement can be displayed, for example.

(4) Use Case 4: RRD Trigger Information

FIG. 16 is a view of the configuration of RRD trigger information.

In FIG. 16, the RRD trigger information has such a structure that header information such as a channel ID, a command ID, and version information and a URI which is location information (locator_part) as a trigger information body are written. An ID identifying a trigger channel via which the RRD trigger information is transmitted is specified as the channel ID. In the case of the RRD trigger information, "7" is specified as the command ID. Moreover, a server URL (e.g., a URL of an RRD server 70 described later with reference to FIG. 17 etc.) for delivering RRD information is specified as the location information.

Rating information (rating) is specified as terms. The rating information contains region information, dimension information, and value information, and viewing restriction can be placed on, e.g., a certain program by these types of information.

(Use Case 4)

Figure 17:
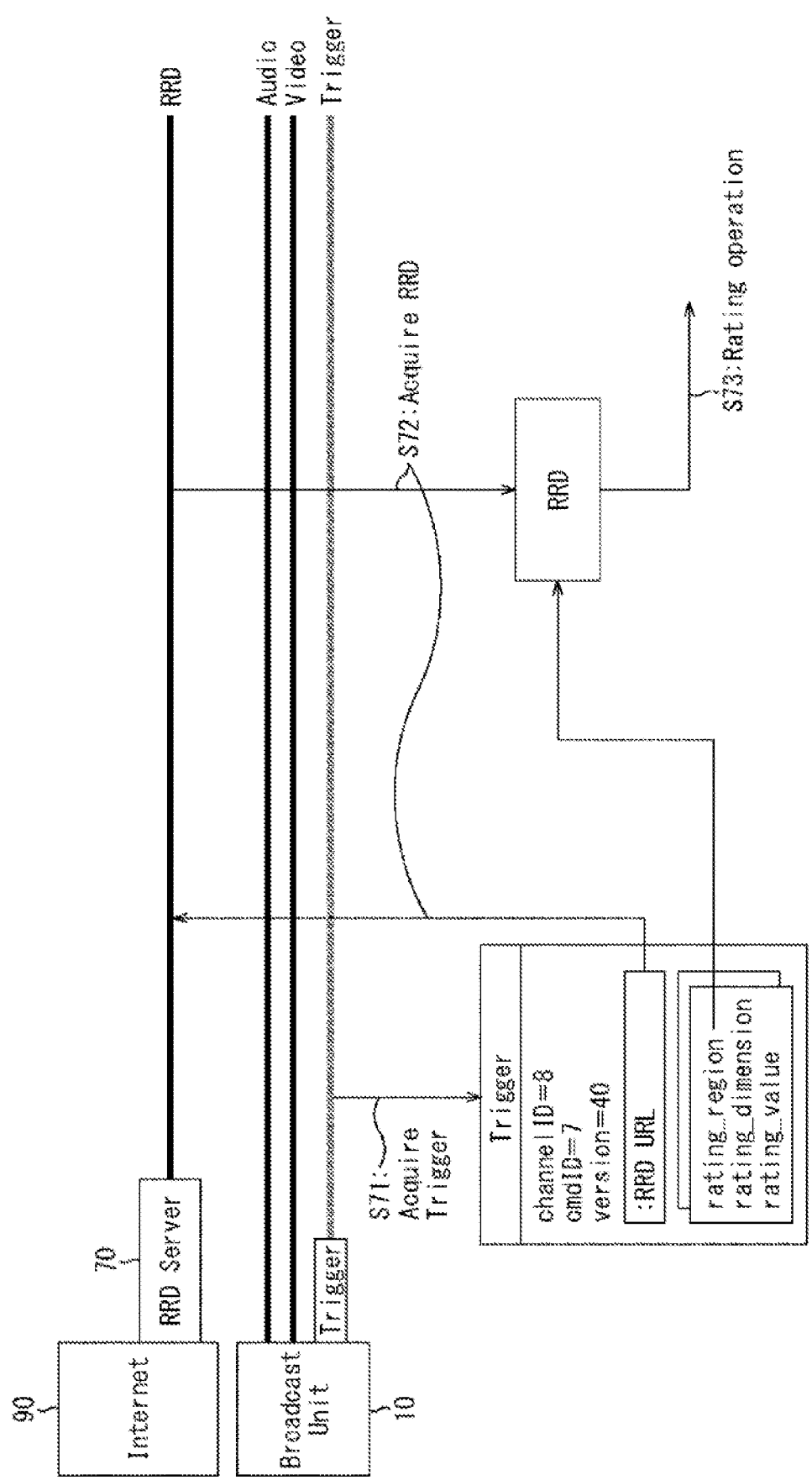
FIG. 17 is a chart for describing a use case 4.

FIG. 17 is a chart for describing a use case 4.

In FIG. 17, a transmission device 10 of a broadcast station (a broadcaster) identified by an RF channel ID transmits, via a digital broadcast signal (Broadcast Signal) using an IP transmission method, a BBP stream identified by a BBP stream ID. Streams of components (Audio/Video) forming broadcast contents delivered as a service identified by a service ID and a stream of signaling information (not shown) are transmitted via the BBP stream.

Moreover, in FIG. 17, an RRD server 70 is provided on the Internet 90. The RRD server 70 is configured to deliver RRD information via the Internet 90.

In FIG. 17, the broadcast contents (e.g., a program) from the transmission device 10 are reproduced in a receiving device 20 by connection to the streams of the components (Audio/Video) forming the broadcast contents.

At the timing at which the transmission device 10 delivers trigger information, the receiving device 20 acquires the trigger information transmitted via a video stream (S71 of FIG. 17). Such trigger information is RRD trigger information with a command ID of "7". The RRD trigger information contains a channel ID, a command ID, and version information as header information, as well as containing location information (RRD URL). Moreover, the RRD trigger information also contains, as rating information, region information, dimension information, and value information.

The receiving device 20 accesses the RRD server 70 via the Internet 90 on the basis of the location information (a URL of the RRD server 70) contained in the RRD trigger information, and then, acquires the RRD information (S72 of FIG. 17). On the basis of the rating information (the region information, the dimension information, and the value information) contained in the RRD trigger information, the receiving device 20 processes the RRD information acquired by the processing of step S72 (S73 of FIG. 17). With viewing restriction (e.g., age restriction) on the broadcast contents during reproduction thereof, when these requirements are not satisfied, reproduction of the broadcast contents can be stopped in the receiving device 20, for example.

Note that in FIG. 17, the trigger information is regularly delivered from the transmission device 10. In the receiving device 20, the version information of the header information contained in the RRD trigger information is monitored, and when the contents of the RRD trigger information are updated, such RRD trigger information is acquired, for example. However, the rating information is not often updated, and for this reason, it is assumed that the frequency of acquiring the RRD trigger information is low.

(Use Case 4 in ACR Handling)

Figure 18:
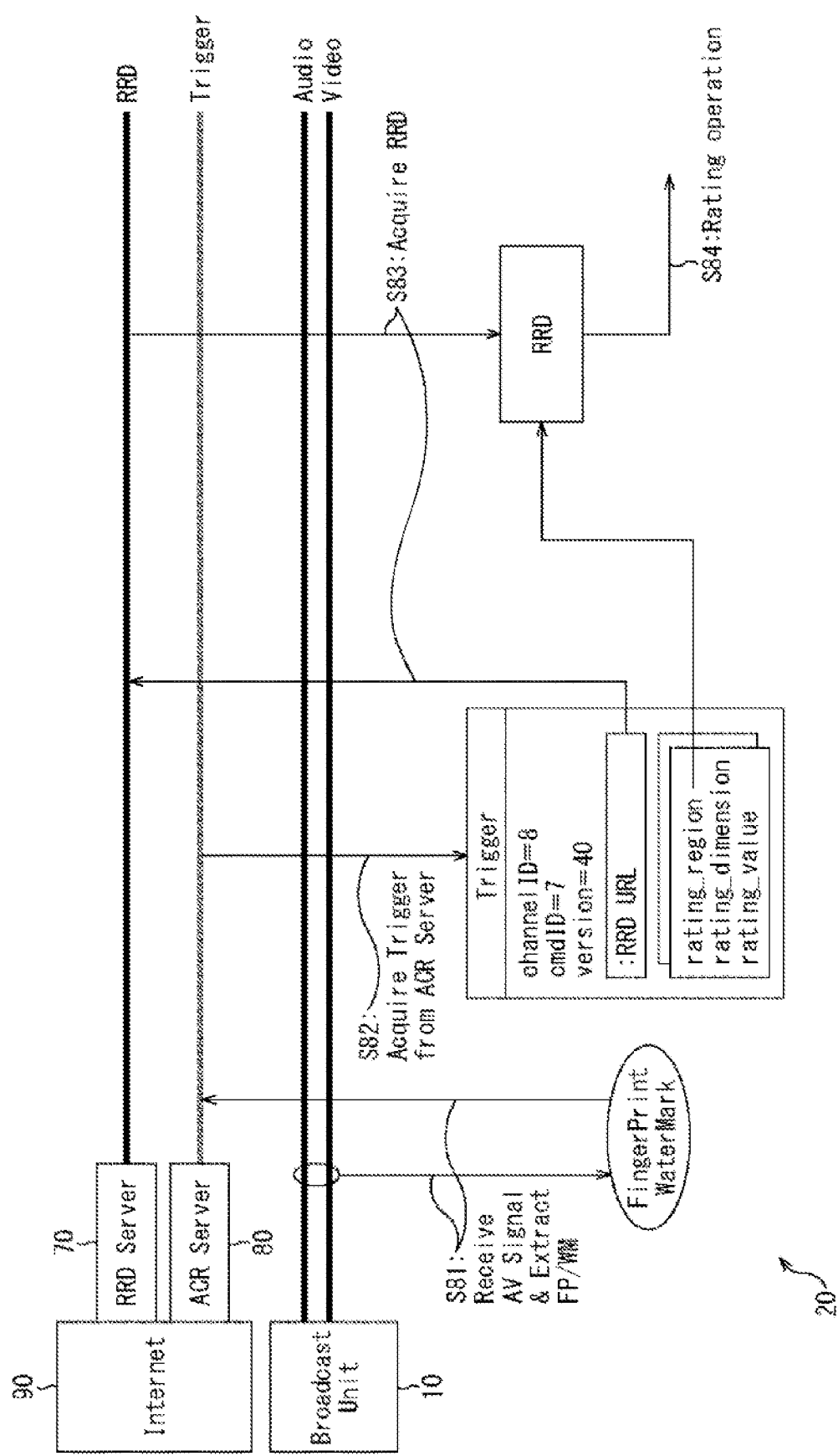
FIG. 18 is a chart for describing the use case 4 in ACR handling.

FIG. 18 shows the case where in the use case 4 shown in FIG. 17, the trigger information is not delivered from the transmission device 10, but is delivered by an ACR server 80.

In FIG. 18, a transmission device 10 of a broadcast station (a broadcaster) transmits, as in FIG. 17 described above, a BBP stream via a digital broadcast signal using an IP transmission method. Streams of components etc. (Audio/Video) forming broadcast contents to be delivered as a service are transmitted via the BBP stream.

Moreover, in FIG. 18, the ACR server 80 is provided on the Internet 90, in addition to an RRD server 70. The ACR server 80 is configured to identify, in response to an inquiry from a receiving device 20, contents using an ACR technique to deliver the trigger information corresponding to such an identification result via the Internet 90.

In FIG. 18, the broadcast contents (e.g., a program) from the transmission device 10 are, in the receiving device 20, reproduced by connection to the streams of the components (Audio/Video) forming the broadcast contents.

The receiving device 20 sends finger print information to the ACR server 80 via the Internet 90, the finger print information being extracted from at least one of video data and audio data of the broadcast contents during reproduction thereof (S81 of FIG. 18). The ACR server 80 sends the trigger information to the receiving device 20 via the Internet 90, the trigger information corresponding to the ACR identification result using the finger print information from the receiving device 20. Note that water mark information may be used instead of the finger print information.

With this configuration, the receiving device 20 acquires (receives), via the Internet 90, the trigger information sent from the ACR server 80 (S82 of FIG. 18). Such trigger information is RRD trigger information with a command ID of "7." The RRD trigger information contains a channel ID, a command ID, and version information as header information, as well as containing location information (RRD URL) and rating information.

Subsequently, the processing of steps S83 to S84 corresponding to the above-described processing of steps S72 to S73 of FIG. 17 is executed in the receiving device 20. That is, the RRD information is acquired from the RRD server 70 via the Internet 90 in the receiving device 20 (S83 of FIG. 18). Then, in the receiving device 20, the RRD information acquired by the processing of step S72 is processed on the basis of the rating information contained in the RRD trigger information. In this manner, in the case where viewing restriction (e.g., age restriction) is placed on the broadcast contents during reproduction thereof, when these requirements are not satisfied, reproduction of the broadcast contents is stopped (S84 of FIG. 18), for example.

Note that when sending the finger print information to the ACR server 80, the receiving device 20 may request the RRD trigger information. In this manner, the receiving device 20 can acquire the RRD trigger information at the timing requiring the rating information, and can acquire the rating information, for example.

The use case 4 has been described above. In the use case 4, the RRD trigger information for providing a function for the RRD information is delivered to the receiving device 20. In this manner, various services such as viewing restriction on contents during reproduction thereof can be provided to the receiving device 20. Moreover, the RRD information is acquired via communication. Thus, even when the RRD information cannot be acquired via broadcasting, the RRD information can be reliably acquired via communication, and as a result, viewing of contents during reproduction thereof can be restricted, for example.

<4. Configuration of System>

(Configuration Example of Broadcast Communication System)

Figure 19:
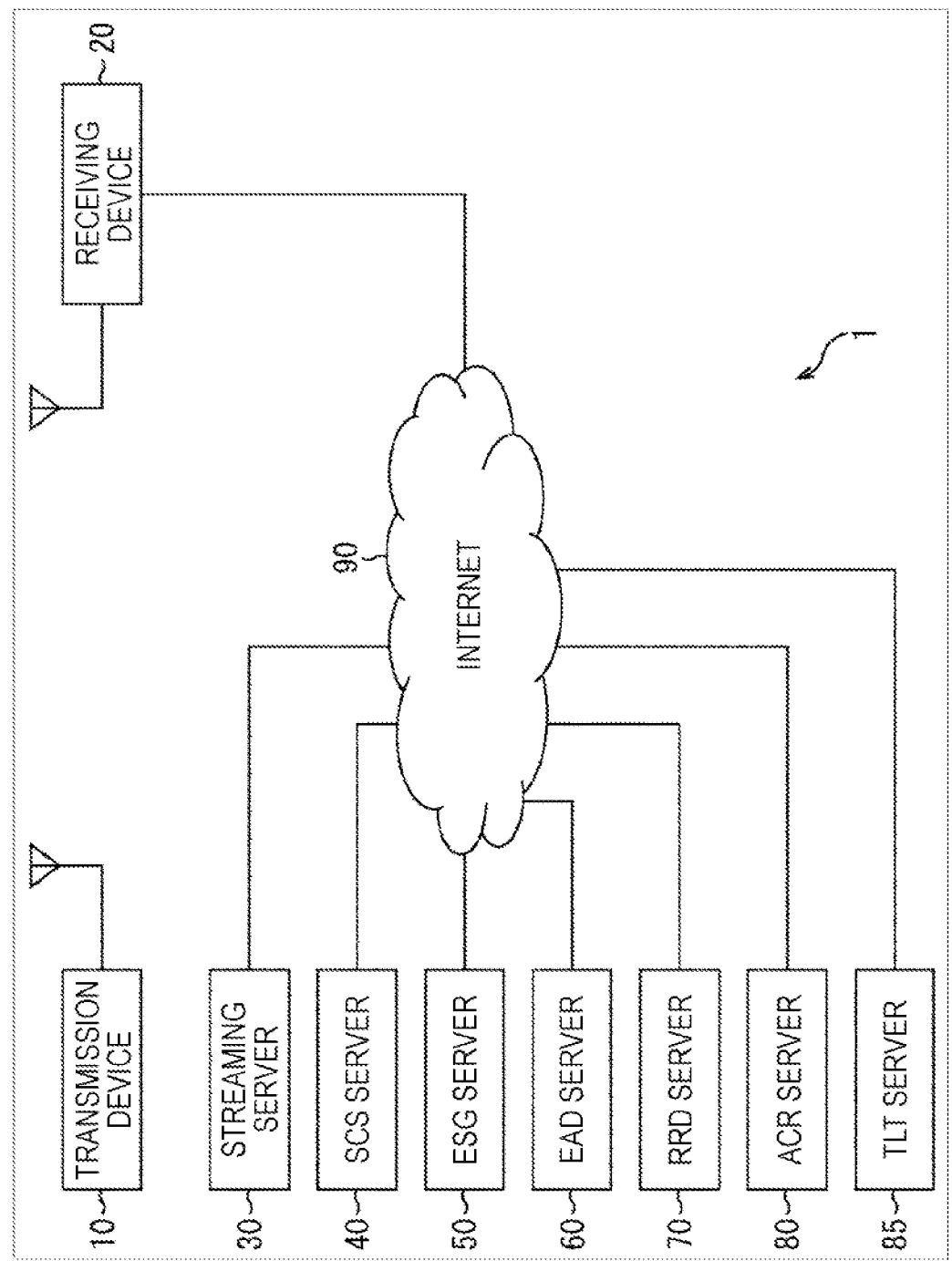
FIG. 19 is a diagram of a configuration example of a broadcast communication system.

FIG. 19 is a diagram of a configuration example of a broadcast communication system. Note that the "system" means an assembly of a plurality of components (e.g., devices).

A broadcast communication system 1 of FIG. 19 has a configuration for realizing control using each type of trigger information of the above-described use cases 1 to 4. That is, in FIG. 19, the broadcast communication system 1 includes a transmission device 10, a receiving device 20, a streaming server 30, a SCS server 40, an ESG server 50, an EAD server 60, an RRD server 70, an ACR server 80, and a TLT server 85. Moreover, the receiving device 20 is interconnected to each server via the Internet 90.

The transmission device 10 is configured to send, via a digital broadcast signal, broadcast contents such as a program and signaling information. Moreover, the transmission device 10 is configured to send the trigger information with the trigger information being contained in the digital broadcast signal. Note that the transmission device 10 is provided by, e.g., a broadcaster, and is disposed in a broadcast station thereof.

The receiving device 20 is configured to receive the digital broadcast signal sent from the transmission device 10. On the basis of the signaling information acquired from the digital broadcast signal, the receiving device 20 reproduces the broadcast contents. Moreover, the receiving device 20 acquires the trigger information sent with the trigger information being contained in the digital broadcast signal from the transmission device 10, and then, performs processing corresponding to various functions provided by the trigger information. Note that the receiving device 20 is, e.g., a television receiver, and is placed in a home etc.

The streaming server 30 is configured to perform streaming delivery of communication contents via the Internet 90 according to a request from the receiving device 20. The receiving device 20 receives streams of the communication contents delivered from the streaming server 30, and then, reproduces the communication contents.

The SCS server 40 is configured to manage SCS signaling information such as MPD information. The SCS server 40 delivers, according to a request from the receiving device 20, the SCS signaling information such as the MPD information via the Internet 90. The ESG server 50 is configured to manage ESG information. The ESG server 50 delivers the ESG information via the Internet 90 according to a request from the receiving device 20.

The EAD server 60 is configured to manage EAD information. The EAD server 60 delivers the EAD information via the Internet 90 according to a request from the receiving device 20. The RRD server 70 is configured to manage RRD information. The RRD server 70 delivers the RRD information via the Internet 90 according to a request from the receiving device 20.

Moreover, the receiving device 20 accesses the ACR server 80 via the Internet 90 to make an inquiry about the trigger information. At this point, the receiving device 20 sends finger print information to the ACR server 80. The receiving device 20 acquires the trigger information sent from the ACR server 80 to perform processing corresponding to various functions provided by the trigger information.

The ACR server 80 performs ACR processing for the finger print information in response to the inquiry from the receiving device 20, and then, identifies contents reproduced at the receiving device 20. The ACR server 80 generates the trigger information corresponding to an ACR identification result, and then, sends the trigger information to the receiving device 20 via the Internet 90. Note that in the broadcast communication system 1, it is not necessary to place the ACR server 80 in the case of using the trigger information contained in the digital broadcast signal from the transmission device 10.

The TLT server 85 is configured to manage TLT information. The TLT server 85 delivers the TLT information via the Internet 90 according to a request from the receiving device 20. Note that a trigger channel list indicating the list of the trigger information to be transmitted for each trigger channel is contained in the TLT information (a TLT of FIG. 6). The receiving device 20 acquires the TLT information (the TLT of FIG. 6) delivered from the TLT server 85 so that the trigger information can be acquired after the trigger information (trigger map information) transmitted for each trigger channel at a current point has been recognized.

The broadcast communication system 1 is configured as described above. Next, a configuration example of each device forming the broadcast communication system 1 of FIG. 19 will be described.

(Configuration Example of Transmission Device)

Figure 20:
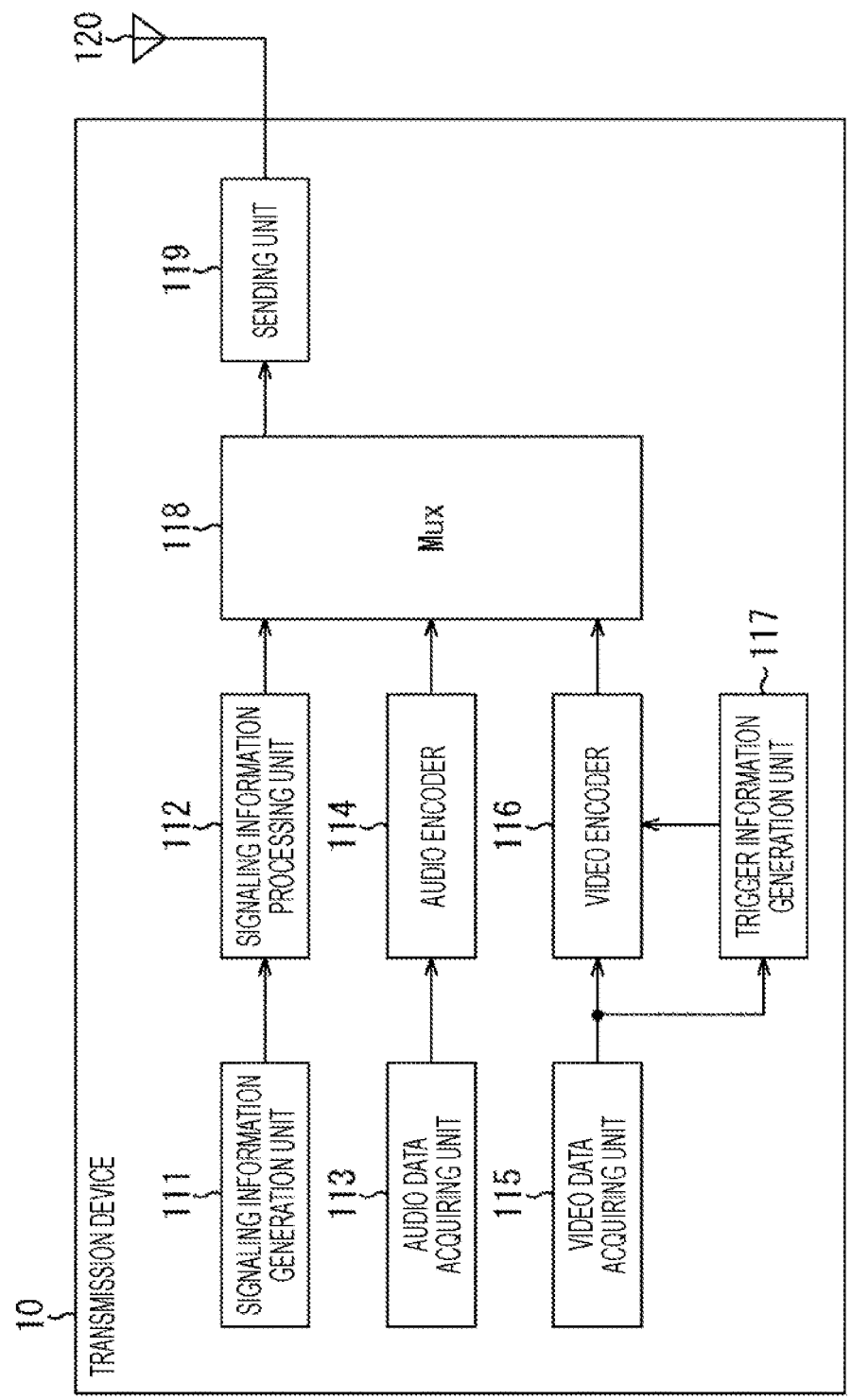
FIG. 20 is a diagram of a configuration example of a transmission device.

FIG. 20 is a diagram of a configuration example of the transmission device 10 of FIG. 19.

In FIG. 20, the transmission device 10 includes a signaling information generation unit 111, a signaling information processing unit 112, an audio data acquiring unit 113, an audio encoder 114, a video data acquiring unit 115, a video encoder 116, a trigger information generation unit 117, a Mux 118, and a sending unit 119.

The signaling information generation unit 111 is configured to generate the signaling information to supply the signaling information to the signaling information processing unit 112. The signaling information processing unit 112 is configured to process the signaling information supplied from the signaling information generation unit 111 to supply the resultant to the Mux 118.

The audio data acquiring unit 113 is configured to acquire audio data of the broadcast contents from, e.g., an external server, a microphone, or a recording medium to supply the audio data to the audio encoder 114. The audio encoder 114 is configured to encode the audio data supplied from the audio data acquiring unit 113 with reference to an encoding method such as Moving Picture Experts Group (MPEG) to supply the resultant to the Mux 118.

The video data acquiring unit 115 is configured to acquire video data of the broadcast contents from, e.g., an external server, a camera, or a recording medium to supply the video data to the video encoder 116 and the trigger information generation unit 117. The video encoder 116 is configured to encode the video data supplied from the video data acquiring unit 115 with reference to the encoding method such as the MPEG to supply the resultant to the Mux 118.

The trigger information generation unit 117 is configured to generate, at predetermined timing, the trigger information (the trigger information having the configuration of FIG. 3) for providing various functions to supply the trigger information to the video encoder 116 or the Mux 118. When encoding the video data, the video encoder 116 can encode the video data in the state in which the trigger information supplied from the trigger information generation unit 117 is embedded in the video data.

The Mux 118 is configured to multiplex the signaling information from the signaling information processing unit 112, the audio stream from the audio encoder 114, and the video stream from the video encoder 116 to supply the resultant BBP stream to the sending unit 119. Note that when the trigger information is supplied from the trigger information generation unit 117, the Mux 118 further multiplexes the trigger information with the signaling information, the audio stream, and the video stream, thereby generating the BBP stream.

The sending unit 119 is configured to send the BBP stream as the digital broadcast signal via an antenna 120, the BBP stream being supplied from the Mux 118.

Note that FIG. 20 shows, as an example, the case of embedding the trigger information in the video data and the case of multiplexing the trigger information into the BBP stream, but the trigger information may be placed by other methods such as the case of embedding the trigger information in the audio data. Moreover, in the transmission device 10, an application, subtitle information, etc. may be sent with the application, the subtitle information, etc. being contained in the digital broadcast signal. In this case, the application, the subtitle information, etc. transmitted with the application, the subtitle information, etc. being contained in the digital broadcast signal are received and processed by the receiving device 20.

(Configuration Example of Receiving Device)

Figure 21:
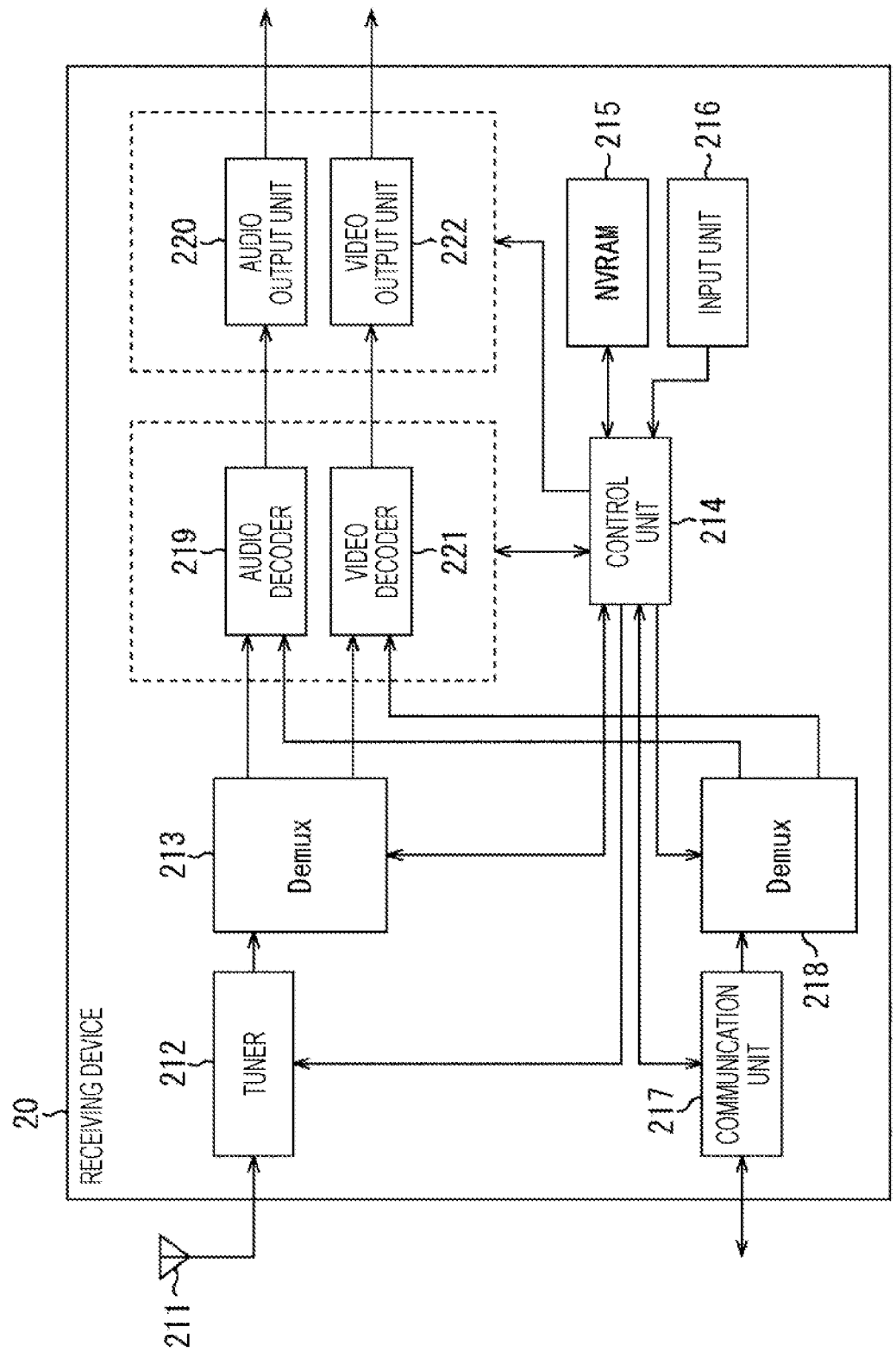
FIG. 21 is a diagram of a configuration example of a receiving device.

FIG. 21 is a diagram of a configuration example of the receiving device 20 of FIG. 19.

In FIG. 21, the receiving device 20 includes a tuner 212, a Demux 213, a control unit 214, a NVRAM 215, an input unit 216, a communication unit 217, a Demux 218, an audio decoder 219, an audio output unit 220, a video decoder 221, and a video output unit 222.

The tuner 212 is configured to extract, according to control from the control unit 214, a digital broadcast signal corresponding to user's tuning operation from a broadcast wave of digital broadcasting (a digital broadcast signal) using an IP transmission method and received via an antenna 211 and to demodulate the extracted digital broadcast signal, thereby supplying the resultant BBP stream to the Demux 213.

The Demux 213 is configured to separate, according to control from the control unit 214, the BBP stream into the streams of audio and video and the signaling information, the BBP stream being supplied via the tuner 212. The Demux 213 supplies the audio data to the audio decoder 219, supplies the video data to the video decoder 221, and supplies the signaling information to the control unit 214.

The control unit 214 is configured to control operation of each unit of the receiving device 20. Moreover, the control unit 214 is configured to control, on the basis of the signaling information supplied from the Demux 213, operation of each unit to acquire streams of components transmitted via broadcasting or communication. Note that the configuration of the control unit 214 will be described later in detail with reference to FIG. 22.

The NVRAM 215 is a non-volatile memory, and is configured to record various types of data according to control from the control unit 214. The input unit 216 is configured to supply an operation signal to the control unit 214 according to user's operation.

The communication unit 217 is configured to access each server via the Internet 90 according to control from the control unit 214 to exchange various types of information. For example, the communication unit 217 accesses the streaming server 30 via the Internet 90 to request streaming delivery of components of the communication contents. The communication unit 217 receives, via the Internet 90, streams of the components streaming-delivered from the streaming server 30, and then, supplies these streams to the Demux 218.

The Demux 218 is configured to separate the steams of the components, which are supplied from the communication unit 217, into audio data and video data according to control from the control unit 214, thereby supplying the audio data to the audio decoder 219 and supplying the video data to the video decoder 221.

The audio data is supplied from the Demux 213 or the Demux 218 to the audio decoder 219. The audio decoder 219 is configured to decode, according to control from the control unit 214, the audio data with reference to a decoding method such as MPEG, thereby supplying the resultant to the audio output unit 220. The audio output unit 220 is configured to output the audio data to a later-stage speaker (not shown), the audio data being supplied from the audio decoder 219. Thus, sound of the broadcast contents or the communication contents is output from the speaker.

The video data is supplied from the Demux 213 or the Demux 218 to the video decoder 221. The video decoder 221 is configured to decode, according to control from the control unit 214, the video data with reference to the decoding method such as the MPEG, thereby supplying the resultant to the video output unit 222. The video output unit 222 is configured to output the video data to a later-stage display (not shown), the video data being supplied from the video decoder 221. Thus, a video image of the broadcast contents or the communication contents is displayed on the display.

(Configuration Example of Control Unit)

Figure 22:
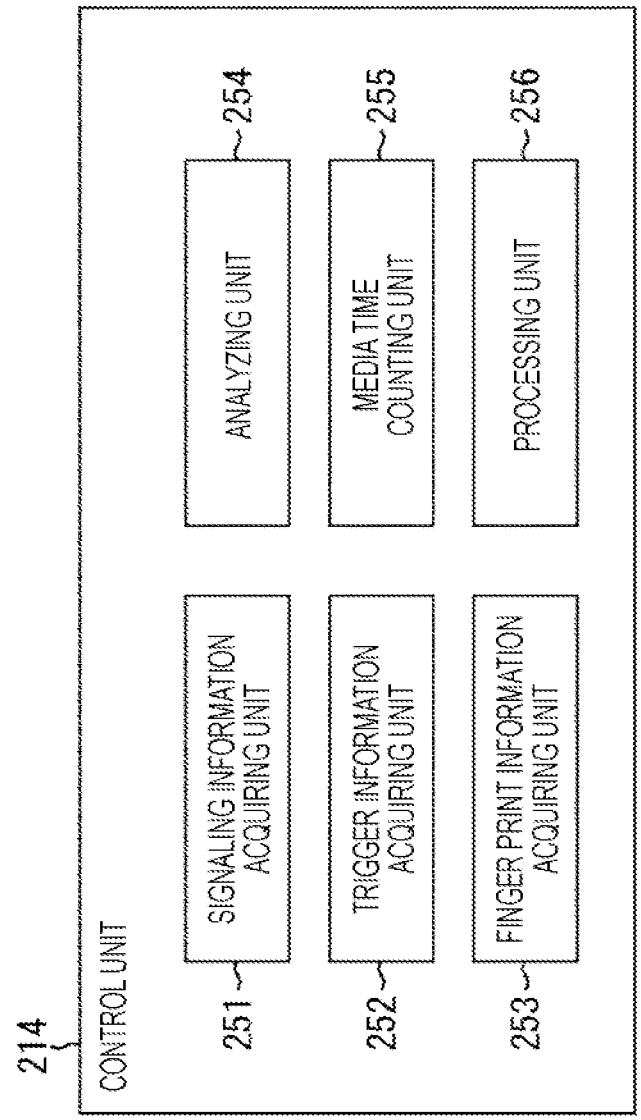
FIG. 22 is a diagram of a configuration example of a control unit.

FIG. 22 is a diagram of a functional configuration example of a section of the control unit 214 of FIG. 21, the section performing the processing for the trigger information for providing various functions.

In FIG. 22, the control unit 214 includes a signaling information acquiring unit 251, a trigger information acquiring unit 252, a finger print information acquiring unit 253, an analyzing unit 254, a media time counting unit 255, and a processing unit 256.

The signaling information acquiring unit 251 is configured to acquire the signaling information supplied from the Demux 213 to supply the signaling information to the analyzing unit 254. The trigger information acquiring unit 252 is configured to constantly monitor the video data output from the video decoder 221 to acquire the trigger information embedded in the video data, thereby supplying the trigger information to the analyzing unit 254. Note that in the case where the trigger information is placed in the BBP stream, the trigger information acquiring unit 252 monitors a packet separated by the Demux 213 and containing the trigger information, and then, acquires the trigger information from such a packet.

The finger print information acquiring unit 253 is configured to acquire (extract) the finger print information from at least one of the audio data output from the audio decoder 219 and the video data output from the video decoder 221, thereby supplying the finger print information to the communication unit 217. The communication unit 217 is connected to the ACR server 80 via the Internet 90 to send the finger print information. The communication unit 217 is configured to receive the trigger information sent from the ACR server 80, thereby supplying the trigger information to the trigger information acquiring unit 252. The trigger information acquiring unit 252 is configured to acquire the trigger information supplied from the communication unit 217, thereby supplying the trigger information to the analyzing unit 254.

The signaling information from the signaling information acquiring unit 251 and the trigger information from the trigger information acquiring unit 252 are supplied to the analyzing unit 254. The analyzing unit 254 is configured to analyze the signaling information to control operation of each section according to such an analysis result. Moreover, the analyzing unit 254 is further configured to analyze the trigger information to supply such an analysis result to the processing unit 256. Note that in the case of containing media time information in the trigger information, the analyzing unit 254 supplies the media time information to the media time counting unit 255.

The media time counting unit 255 is configured to set the media time information supplied from the analyzing unit 254, thereby counting time using the media time information. The processing unit 256 is configured to perform, according to the trigger information analysis result from the analyzing unit 254, processing corresponding to various functions provided by the trigger information.

(Configuration Example of Each Server)

Figure 23:
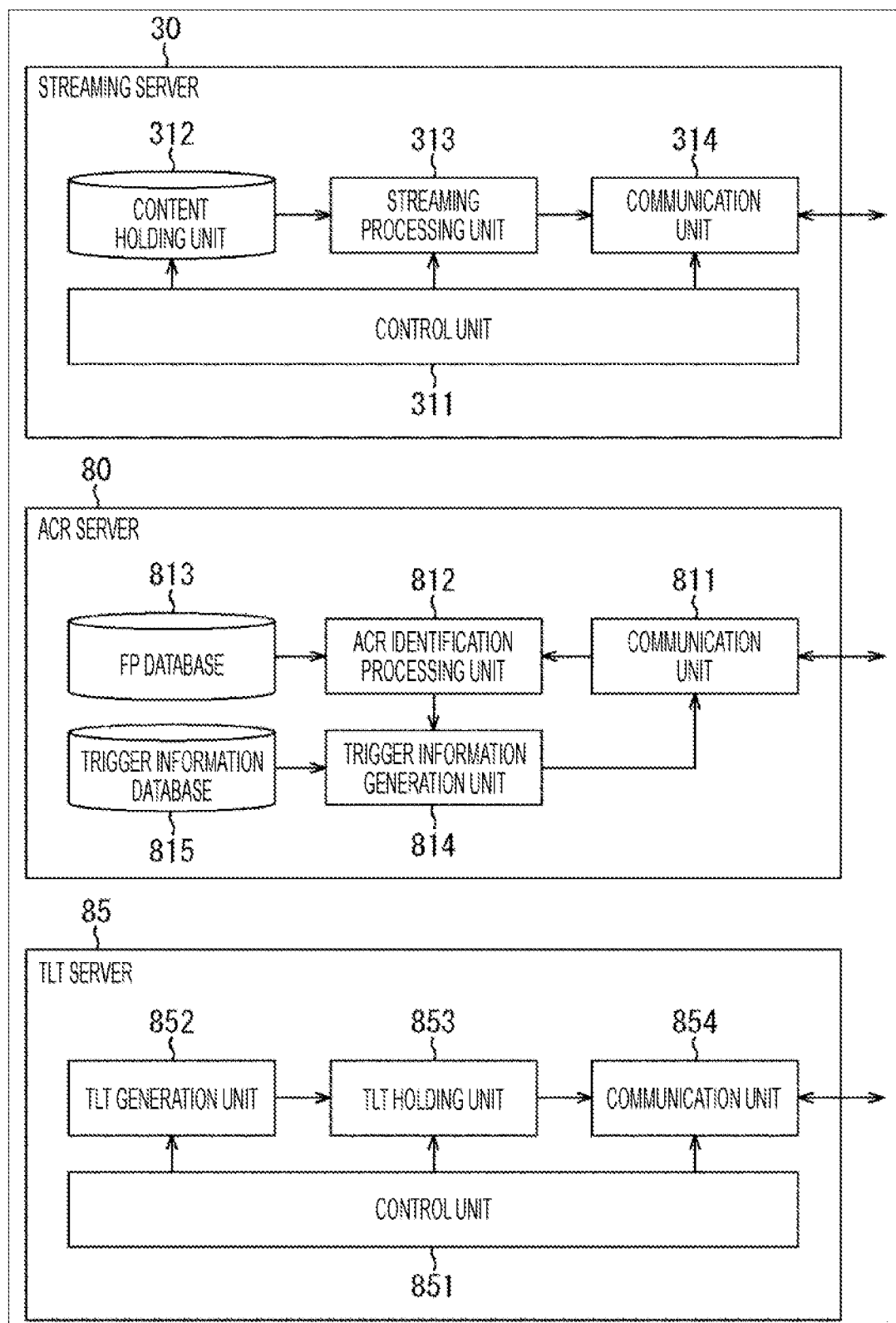
FIG. 23 is a diagram of a configuration example of each server.
Figure 24:
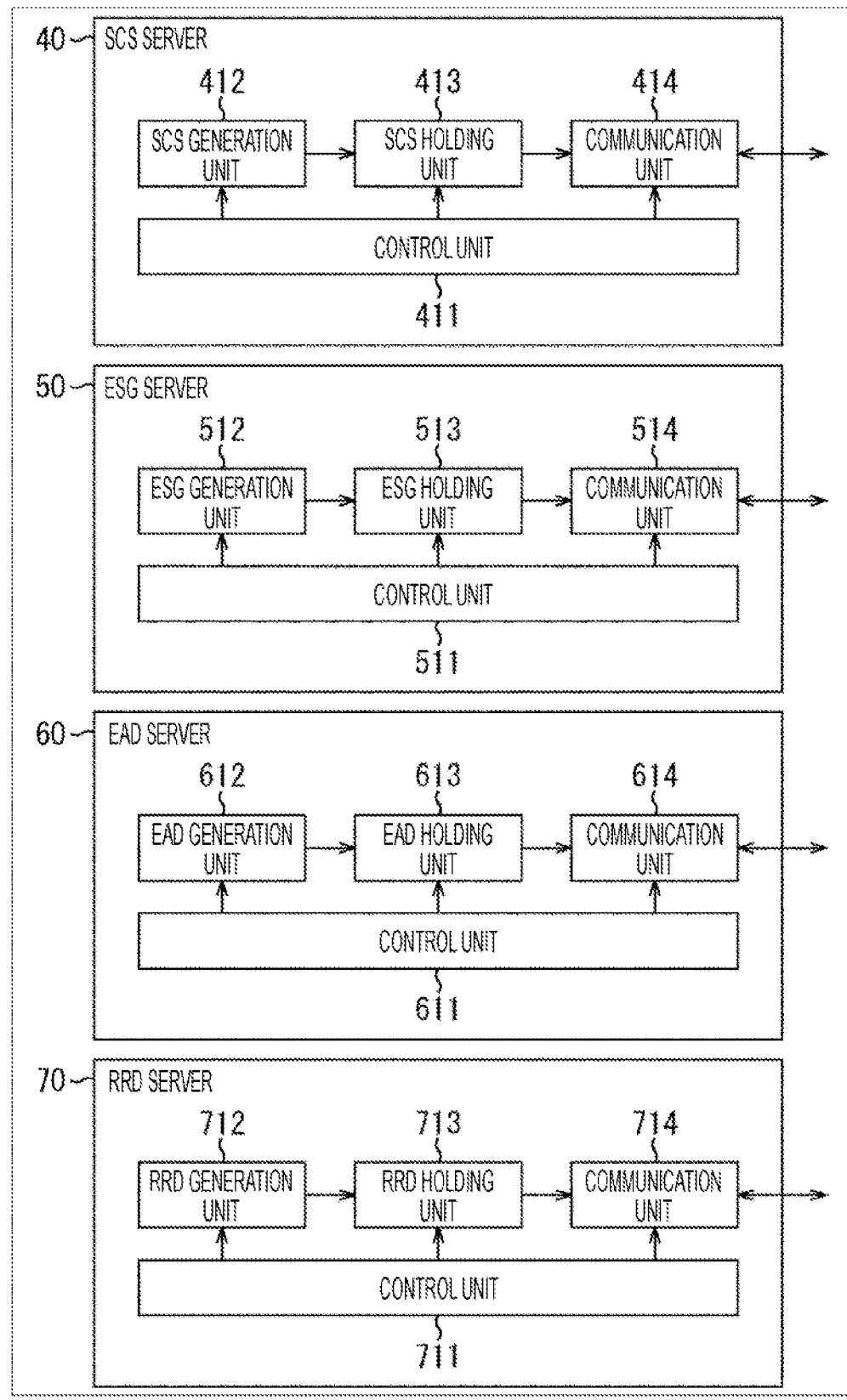
FIG. 24 is a diagram of a configuration example of each server.

FIGS. 23 and 24 are diagrams of a configuration example of each server of FIG. 19. FIG. 23 illustrates configuration examples of the streaming server 30, the ACR server 80, and the TLT server 85. Moreover, FIG. 24 illustrates configuration examples of the SCS server 40, the ESG server 50, the EAD server 60, and the RRD server 70.

(Configuration Example of Streaming Server)

In FIG. 23, the streaming server 30 includes a control unit 311, a content holding unit 312, a streaming processing unit 313, and a communication unit 314. The control unit 311 is configured to control operation of each section of the streaming server 30. The content holding unit 312 is configured to hold the communication contents. The streaming processing unit 313 is configured to perform the processing of streaming-delivering the communication contents (the components forming the communication contents) held in the content holding unit 312.

The communication unit 314 is configured to communicate with the receiving device 20 via the Internet 90 according to control from the control unit 311. The control unit 311 constantly monitors a communication status of the communication unit 314. When streaming delivery of the communication contents is requested from the receiving device 20, the control unit 311 causes the streaming processing unit 313 to process the communication contents held in the content holding unit 312 and to supply the processed communication contents to the communication unit 314. The communication unit 314 streaming-delivers the streams of the communication contents (the streams of the components forming the communication contents) to the requester-side receiving device 20 via the Internet 90, the communication contents being processed by the streaming processing unit 313.

The streaming server 30 is configured as described above.

(Configuration Example of ACR Server)

In FIG. 23, the ACR server 80 includes a communication unit 811, an ACR identification processing unit 812, an FP database 813, a trigger information generation unit 814, and a trigger information database 815. The communication unit 811 is configured to communicate with the receiving device 20 via the Internet 90. When receiving an inquiry on the trigger information from the receiving device 20, the communication unit 811 receives the finger print information to supply the finger print information to the ACR identification processing unit 812.

The ACR identification processing unit 812 is configured to check the finger print information supplied from the communication unit 811 against the FP database 813 prepared in advance, thereby performing the ACR identification processing of identifying the contents during reproduction thereof in the inquirer-side receiving device 20. The ACR identification processing unit 812 is configured to supply an ACR identification processing result to the trigger information generation unit 814.

Note that the finger print information (a feature value) is information unique to all or some of the components of the contents, and many pieces of the content unique information are registered in advance in the FP database 813. In the ACR identification processing, the degree of similarity or coincidence of these types of unique information is determined, for example. Moreover, well-known techniques disclosed in various documents etc. can be used as the method for determining the degree of similarity or coincidence.

The trigger information generation unit 814 is configured to generate the trigger information (the trigger information having the configuration of FIG. 3) for providing various functions on the basis of the ACR identification processing result supplied from the ACR identification processing unit 812 and various types of information registered in the trigger information database 815, thereby supplying the trigger information to the communication unit 811. The communication unit 811 is configured to send the trigger information to the inquirer-side receiving device 20 via the Internet 90, the trigger information being supplied from the trigger information generation unit 814.

The ACR server 80 is configured as described above.

(Configuration Example of TLT Server)

In FIG. 23, the TLT server 85 includes a control unit 851, a TLT generation unit 852, a TLT holding unit 853, and a communication unit 854. The control unit 851 is configured to control operation of each section of the TLT server 85. The TLT generation unit 852 is configured to generate, according to control from the control unit 851, the TLT information containing the trigger channel list and to cause the TLT holding unit 853 to hold the TLT information.

The communication unit 854 is configured to communicate, according to control from the control unit 851, with the receiving device 20 via the Internet 90. The control unit 851 constantly monitors a communication status of the communication unit 854. When the TLT information is requested from the receiving device 20, the control unit 851 acquires the TLT information from the TLT holding unit 853 to supply the TLT information to the communication unit 854. The communication unit 854 sends, according to control from the control unit 851, the TLT information to the requester-side receiving device 20 via the Internet 90.

The TLT server 85 is configured as described above.

(Configuration Example of SCS Server)

In FIG. 24, the SCS server 40 includes a control unit 411, a SCS generation unit 412, a SCS holding unit 413, and a communication unit 414. The control unit 411 is configured to control operation of each section of the SCS server 40. The SCS generation unit 412 is configured to generate, according to control from the control unit 411, the SCS signaling information such as the MPD information and to cause the SCS holding unit 413 to hold the SCS signaling information.

The communication unit 414 is configured to communicate, according to control from the control unit 411, with the receiving device 20 via the Internet 90. The control unit 411 constantly monitors a communication status of the communication unit 414. When the signaling information is requested from the receiving device 20, the control unit 411 acquires the SCS signaling information (e.g., the MPD information) from the SCS holding unit 413 to supply the SCS signaling information to the communication unit 414. The communication unit 414 sends, according to control from the control unit 411, the SCS signaling information (e.g., the MPD information) to the requester-side receiving device 20 via the Internet 90.

The SCS server 40 is configured as described above.

(Configuration Example of ESG Server)

In FIG. 24, the ESG server 50 includes a control unit 511, an ESG generation unit 512, an ESG holding unit 513, and a communication unit 514. The control unit 511 is configured to control operation of each section of the ESG server 50. The ESG generation unit 512 is configured to generate the ESG information according to control from the control unit 511 and to cause the ESG holding unit 513 to hold the ESG information.

The communication unit 514 is configured to communicate, according to control from the control unit 511, with the receiving device 20 via the Internet 90. The control unit 511 constantly monitors a communication status of the communication unit 514. When the ESG information is requested from the receiving device 20, the control unit 511 acquires the ESG information from the ESG holding unit 513 to supply the ESG information to the communication unit 514. The communication unit 514 sends, according to control from the control unit 511, the ESG information to the requester-side receiving device 20 via the Internet 90.

The ESG server 50 is configured as described above.

(Configuration Example of EAD Server)

In FIG. 24, the EAD server 60 includes a control unit 611, an EAD generation unit 612, an EAD holding unit 613, and a communication unit 614. The control unit 611 is configured to control operation of each section of the BAD server 60. The EAD generation unit 612 is configured to generate the EAD information according to control from the control unit 611 and to cause the EAD holding unit 613 to hold the EAD information.

The communication unit 614 is configured to communicate, according to control from the control unit 611, with the receiving device 20 via the Internet 90. The control unit 611 constantly monitors a communication status of the communication unit 614. When the EAD information is requested from the receiving device 20, the control unit 611 acquires the EAD information from the EAD holding unit 613 to supply the EAD information to the communication unit 614. The communication unit 614 sends, according to control from the control unit 611, the EAD information to the requester-side receiving device 20 via the Internet 90.

The EAD server 60 is configured as described above.

(Configuration Example of RRD Server)

In FIG. 24, the RRD server 70 includes a control unit 711, an RRD generation unit 712, an RRD holding unit 713, and a communication unit 714. The control unit 711 is configured to control operation of each section of the RRD server 70. The RRD generation unit 712 is configured to generate the RRD information according to control from the control unit 711 and to cause the RRD holding unit 713 to hold the RRD information.

The communication unit 714 is configured to communicate, according to control from the control unit 711, with the receiving device 20 via the Internet 90. The control unit 711 constantly monitors a communication status of the communication unit 714. When the RRD information is requested from the receiving device 20, the control unit 711 acquires the RRD information from the RRD holding unit 713 to supply the RRD information to the communication unit 714. The communication unit 714 sends, according to control from the control unit 711, the RRD information to the requester-side receiving device 20 via the Internet 90.

The RRD server 70 is configured as described above.

<5. Flow of Processing Executed by Each Device>

Next, the flow of processing executed by each device forming the broadcast communication system 1 of FIG. 19 will be described with reference to flowcharts of FIGS. 25 to 38.

(Digital Broadcast Signal Sending Processing)

Figure 25:
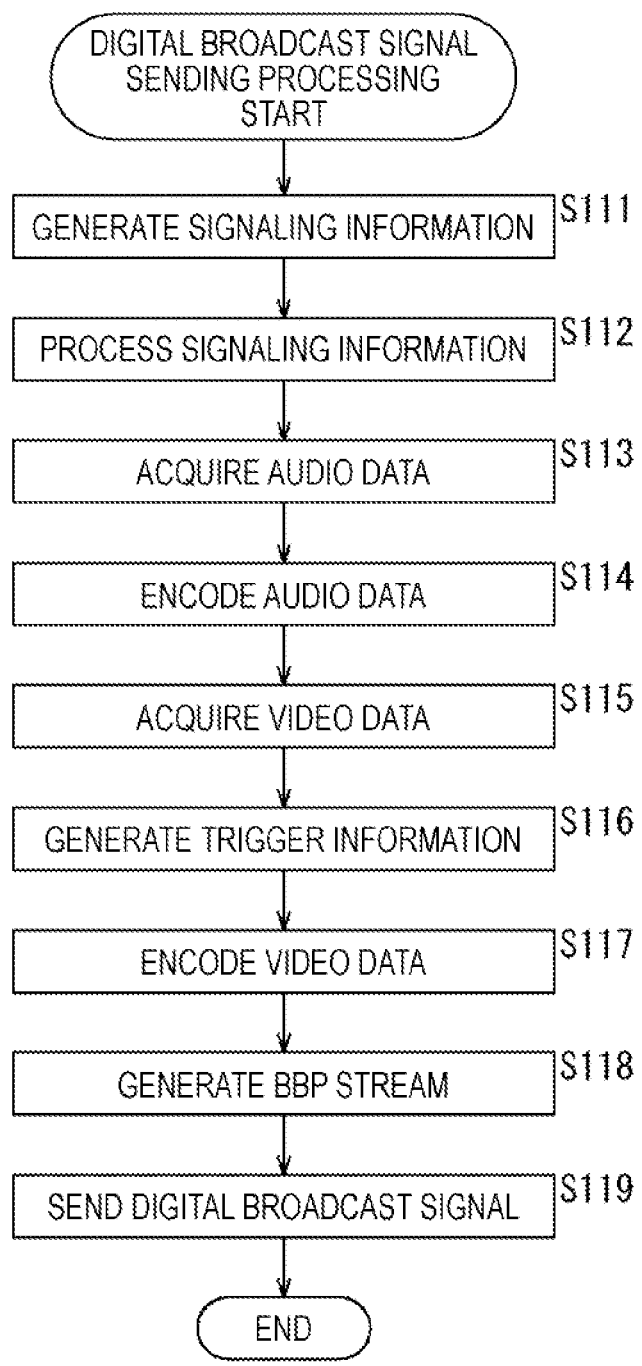
FIG. 25 is a flowchart for describing the flow of digital broadcast signal sending processing.

First, the flow of digital broadcast signal sending processing executed by the transmission device 10 of FIG. 19 will be described with reference to the flowchart of FIG. 25.

At step S111, the signaling information generation unit 111 generates signaling information. At step S112, the signaling information processing unit 112 processes the signaling information generated by the processing of step S111.

At step S113, the audio data acquiring unit 113 acquires audio data of broadcast contents from, e.g., an external server. At step S114, the audio encoder 114 encodes, with reference to an encoding method such as a MPEG, the audio data acquired by the processing of step S113.

At step S115, the video data acquiring unit 115 acquires video data of the broadcast contents from, e.g., an external server. At step S116, the trigger information generation unit 117 generates trigger information (the trigger information having the configuration of FIG. 3) for providing various functions.

At step S117, the video encoder 116 encodes, with reference to an encoding method such as MPEG, the video data acquired by the processing of step S115. Note that in encoding of the video data, the video encoder 116 performs encoding in the state in which the trigger information supplied from the trigger information generation unit 117 is embedded in the video data.

At step S118, the Mux 118 multiplexes the signaling information processed at step S112, the audio data encoded at step S114, and the video data encoded at step S117, and then, supplies the resultant BBP stream to the sending unit 119.

At step S119, the sending unit 119 sends, via the antenna 120, the BBP stream generated by the processing of step S118 as a digital broadcast signal using an IP transmission method. When the processing of step S119 is completed, the digital broadcast signal sending processing of FIG. 25 ends.

The flow of the digital broadcast signal sending processing has been described above. Note that in the digital broadcast signal sending processing of FIG. 25, the case of embedding the trigger information in the video data has been described as an example for the sake of simplicity of description.

(Digital Broadcast Signal Receiving Processing)

Figure 26:
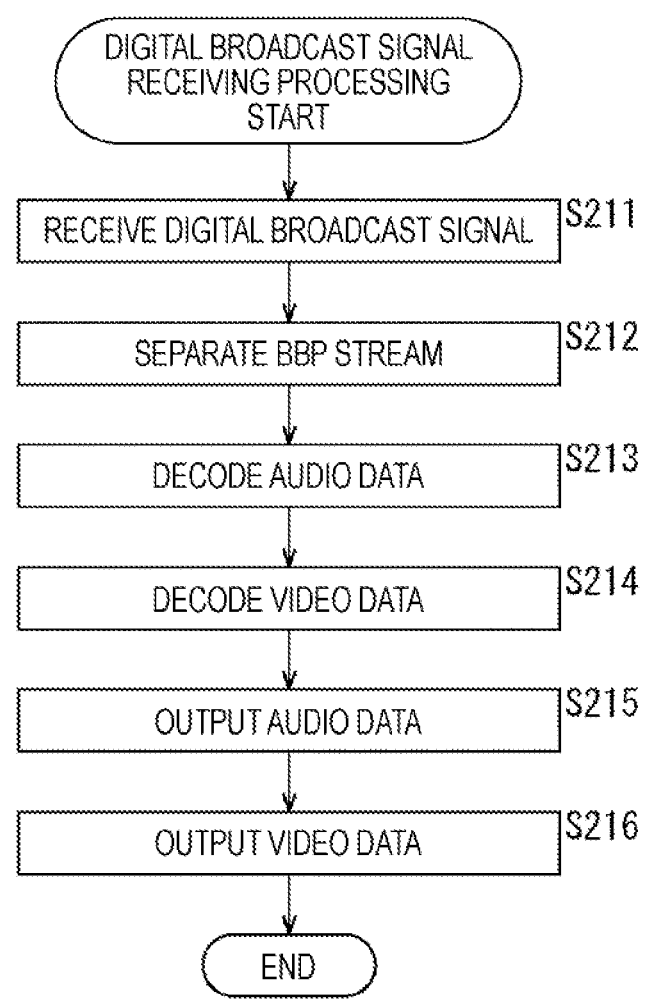
FIG. 26 is a flowchart for describing the flow of digital broadcast signal receiving processing.

Next, the flow of digital broadcast signal receiving processing executed by the receiving device 20 of FIG. 19 will be described with reference to the flowchart of FIG. 26.

At step S211, the tuner 212 performs tuning/demodulation of the digital broadcast signal using the IP transmission method and received via the antenna 211. Then, at step S212, the Demux 213 separates the audio data and the video data from the BBP stream demodulated by the processing of step S211.

At step S213, the audio decoder 219 decodes, by a decoding method corresponding to the encoding method by the audio encoder 114 (FIG. 20), the audio data separated by the processing of step S212. Then, at step S214, the video decoder 221 decodes, by a decoding method corresponding to the encoding method by the video encoder 116 (FIG. 20), the video data separated by the processing of step S212.

At step S215, the audio output unit 220 outputs, to the later-stage speaker (not shown), the audio data decoded by the processing of step S213. Then, at step S216, the video output unit 222 outputs, to the later-stage display (not shown), the video data decoded by the processing of step S214. In this manner, a video image of the broadcast contents is displayed on the display, and sound synchronized with such a video image is output from the speaker. When the processing of step S216 is completed, the digital broadcast signal receiving processing of FIG. 26 ends.

The flow of the digital broadcast signal receiving processing has been described above.

(Trigger Information Handling Processing)

Next, the flow of trigger information handling processing executed by the receiving device 20 of FIG. 19 will be described with reference to the flowchart of FIG. 27. Note that in execution of the trigger information handling processing, the broadcast contents delivered from the transmission device 10 are reproduced at the receiving device 20.

At step S231, the trigger information acquiring unit 252 constantly monitors the video data output from the video decoder 219 to determine whether or not the trigger information embedded in the video data is acquired. Note that when finger print information is sent to the ACR server 80 via the Internet 90 to make an inquiry about the trigger information, the trigger information acquiring unit 252 monitors the communication unit 217 to determine whether or not the trigger information from the ACR server 80 is received (acquired).

When it is, at step S231, determined that the trigger information is not acquired, the determination processing of step S231 is repeated. After the trigger information has been acquired by the trigger information acquiring unit 252 at step S231, the processing proceeds to step S232.

At step S232, the analyzing unit 254 analyzes the trigger information acquired by the processing of step S231. At step S233, it is, according to an analysis result of the processing of step S232, determined whether or not a command ID contained in the trigger information targeted for analysis is "3."

When it is, at step S233, determined that the command ID contained in the trigger information targeted for analysis is "3," the trigger information targeted for analysis is SCS trigger information. Thus, the processing proceeds to step S234. At step S234, SCS trigger information handling processing is performed. Although the contents of the SCS trigger information handling processing will be described later in detail with reference to the flowchart of FIG. 28, processing similar to that of the above-described use case 1 (FIGS. 8 and 9) is performed.

Note that when the SCS trigger information is transmitted via multiple trigger channels, a channel ID contained in the trigger information targeted for analysis is used to identify the SCS trigger information targeted for processing.

On the other hand, when it is, at step S233, determined that the command ID contained in the trigger information targeted for analysis is not "3," the processing proceeds to step S235. At step S235, it is, according to the analysis result of the processing of step S232, determined whether or not the command ID contained in the trigger information targeted for analysis is "5."

When it is, at step S235, determined that the command ID contained in the trigger information targeted for analysis is "5," the trigger information targeted for analysis is ESG trigger information. Thus, the processing proceeds to step S236. At step S236, ESG trigger information handling processing is performed. Although the contents of the ESG trigger information handling processing will be described later in detail with reference to the flowchart of FIG. 29, processing similar to that of the above-described use case 2 (FIGS. 11 and 12) is performed.

Note that when the ESG trigger information is transmitted via multiple trigger channels, the channel ID contained in the trigger information targeted for analysis is used to identify the ESG trigger information targeted for processing.

On the other hand, when it is, at step S235, determined that the command ID contained in the trigger information targeted for analysis is not "5," the processing proceeds to step S237. At step S237, it is, according to the analysis result of the processing of step S232, determined whether or not the command ID contained in the trigger information targeted for analysis is "6."

When it is, at step S237, determined that the command ID contained in the trigger information targeted for analysis is "6," the trigger information targeted for analysis is EAD trigger information. Thus, the processing proceeds to step S238. At step S238, EAD trigger information handling processing is performed. Although the contents of the EAD trigger information handling processing will be described later in detail with reference to the flowchart of FIG. 30, processing similar to that of the above-described use case 3 (FIGS. 14 and 15) is performed.

Note that when the SAD trigger information is transmitted via multiple trigger channels, the channel ID contained in the trigger information targeted for analysis is used to identify the EAD trigger information targeted for processing.

On the other hand, when it is, at step S237, determined that the command ID contained in the trigger information targeted for analysis is not "6," the processing proceeds to step S239. At step S239, it is, according to the analysis result of the processing of step S232, determined whether or not the command ID contained in the trigger information targeted for analysis is "7."

When it is, at step S239, determined that the command ID contained in the trigger information targeted for analysis is "7," the trigger information targeted for analysis is RRD trigger information. Thus, the processing proceeds to step S240. At step S240, RRD trigger information handling processing is performed. Although the contents of the RRD trigger information handling processing will be described later in detail with reference to the flowchart of FIG. 31, processing similar to that of the above-described use case 4 (FIGS. 17 and 18) is performed.

Note that when the RRD trigger information is transmitted via multiple trigger channels, the channel ID contained in the trigger information targeted for analysis is used to identify the RRD trigger information targeted for processing.

On the other hand, when it is, at step S239, determined that the command ID contained in the trigger information targeted for analysis is not "7," the processing proceeds to step S241. At step S241, other types of trigger information handling processing are performed. In the other types of trigger information handling processing, control using the trigger information for providing various functions, such as application trigger information and subtitle trigger information, is performed.

Figure 27:
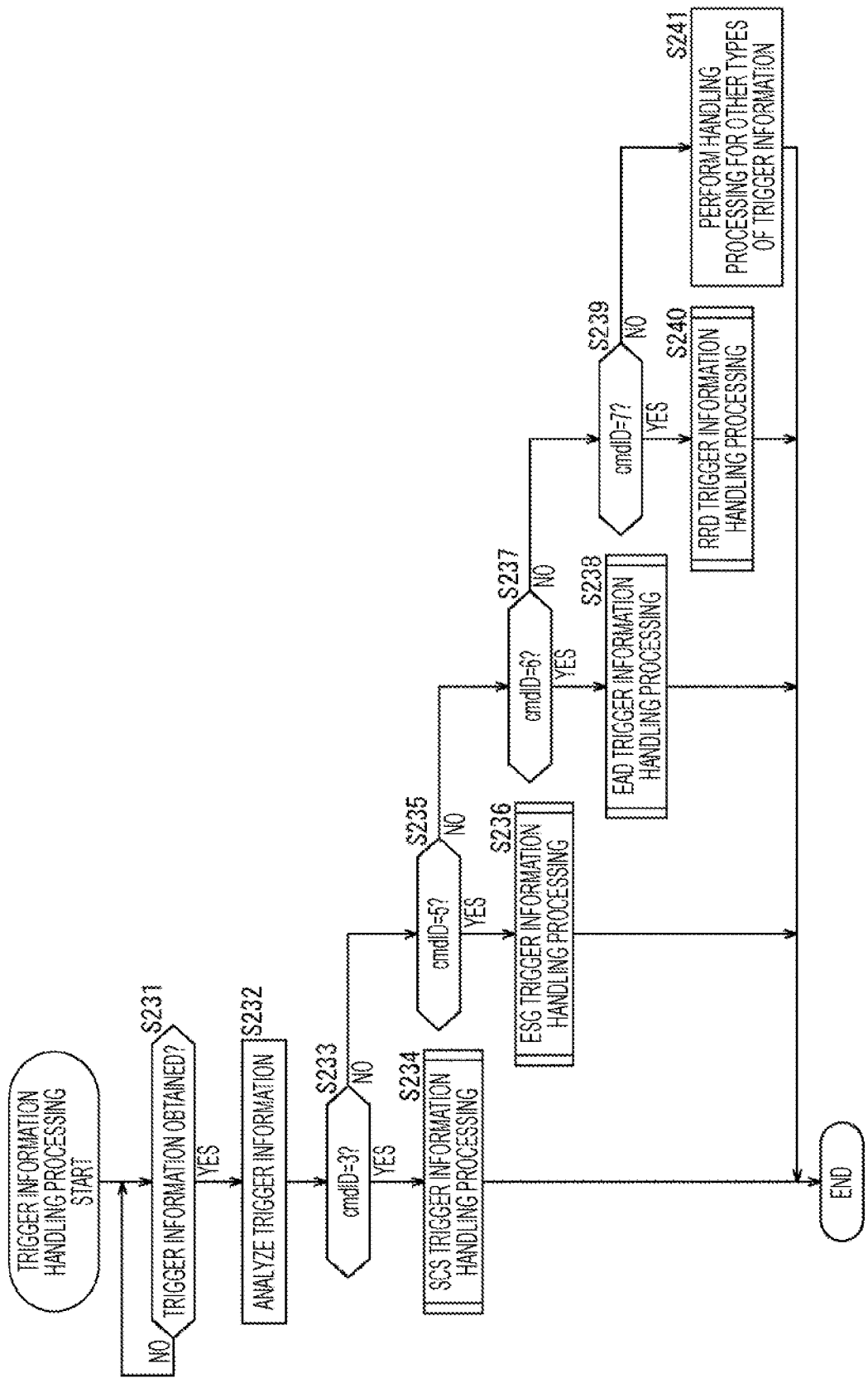
FIG. 27 is a flowchart for describing the flow of trigger information handling processing.

After the processing of any one of steps S234, S236, S238, S240, S241 has been completed, the trigger information handling processing of FIG. 27 ends.

The flow of the trigger information handling processing has been described above.

(SCS Trigger Information Handling Processing)

Figure 28:
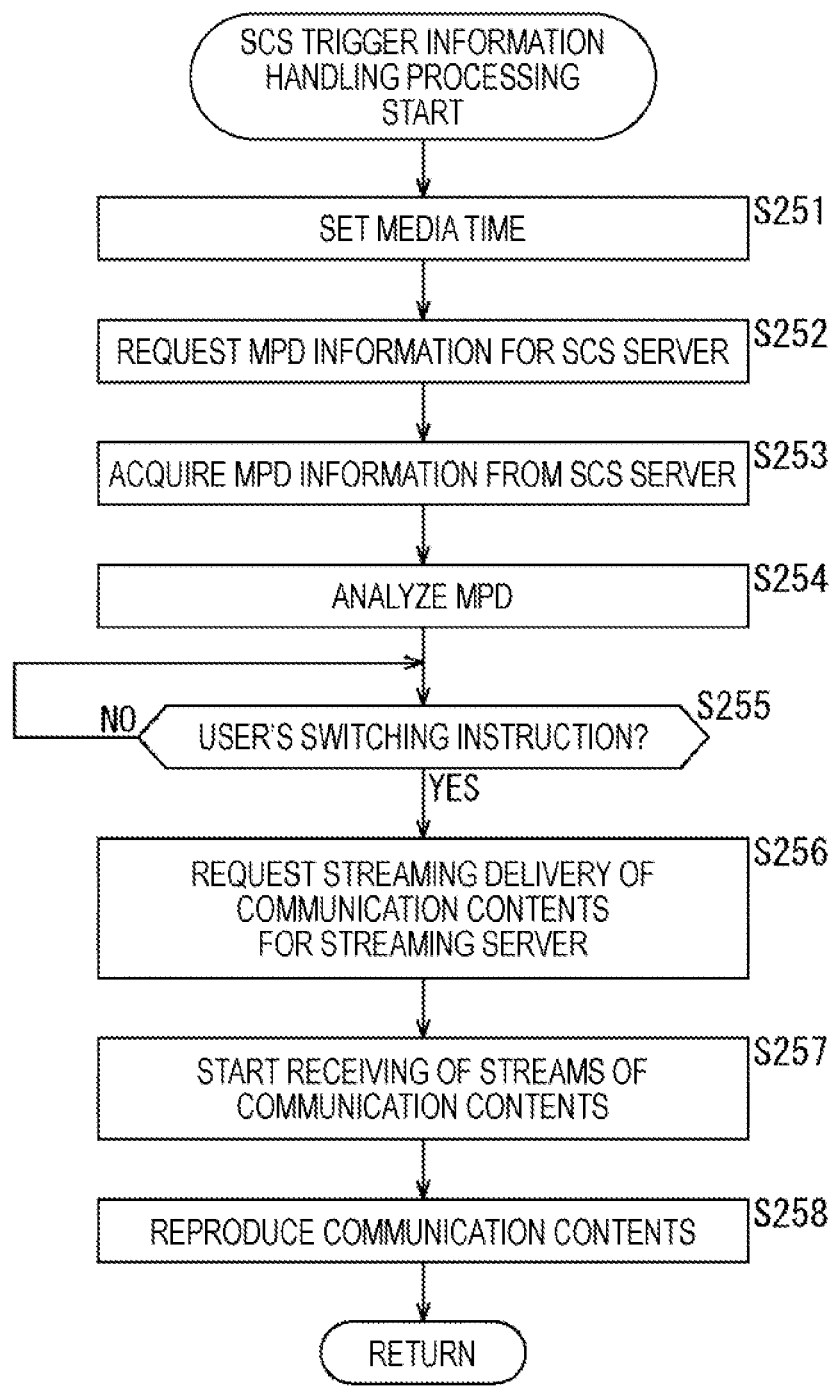
FIG. 28 is a flowchart for describing the flow of SCS trigger information handling processing.

Next, the flow of the SCS trigger information handling processing corresponding to the processing of step S234 of FIG. 27 will be described with reference to the flowchart of FIG. 28.

At step S251, the media time counting unit 255 sets, according to the analysis result of the processing of step S232 of FIG. 27, media time information contained in the SCS trigger information. Accordingly, counting of time on the basis of the media time information begins.

At step S252, the processing unit 256 controls the communication unit 217 on the basis of the analysis result (location information contained in the SCS trigger information) of the processing of step S232 of FIG. 27 to access the SCS server 40 via the Internet 90, thereby requesting MPD information. At step S253, the processing unit 256 acquires, as a result of the request for the SCS server 40 in the processing of step S252, the MPD information delivered from the SCS server 40 via the Internet 90.

At step S254, the processing unit 256 analyzes the MPD information acquired by the processing of step S253. Such analyzing processing determines whether, e.g., a stream specified by a segment URL written in an AdaptationSet element or a Representation element of MPD is transmitted as a broadcast stream or a communication stream.

At step S255, when a multi-view service is provided, it is determined whether or not the instruction of switching from a main view to a sub-view is provided by a user. When it is, at step S255, determined that the switching instruction is not provided by the user, the determination processing of step S255 is repeated. In this case, the broadcast contents delivered from the transmission device 10 are continuously reproduced on the main view in the receiving device 20.

On the other hand, when it is, at step S255, determined that the switching instruction is provided by the user, the processing proceeds to step S256. At step S256, the processing unit 256 controls the communication unit 217 according to an analysis result of the processing of step S254 to access the streaming server 30 via the Internet 90, thereby requesting streaming delivery of communication contents.

Then, the communication unit 217 begins receiving streams of the communication contents (streams of components forming the communication contents) streaming-delivered from the streaming server 30 (S257), and then, the communication contents are reproduced (S258). Accordingly, the main view is switched to the sub-view in the receiving device 20, and the communication contents streaming-delivered from the streaming server 30 are reproduced on the sub-view.

When the processing of step S258 is completed, the processing returns to the processing of step S234 of FIG. 27, and then, the processing of step S234 and subsequent steps are executed.

The flow of the SCS trigger information handling processing has been described above.

(ESG Trigger Information Handling Processing)

Figure 29:
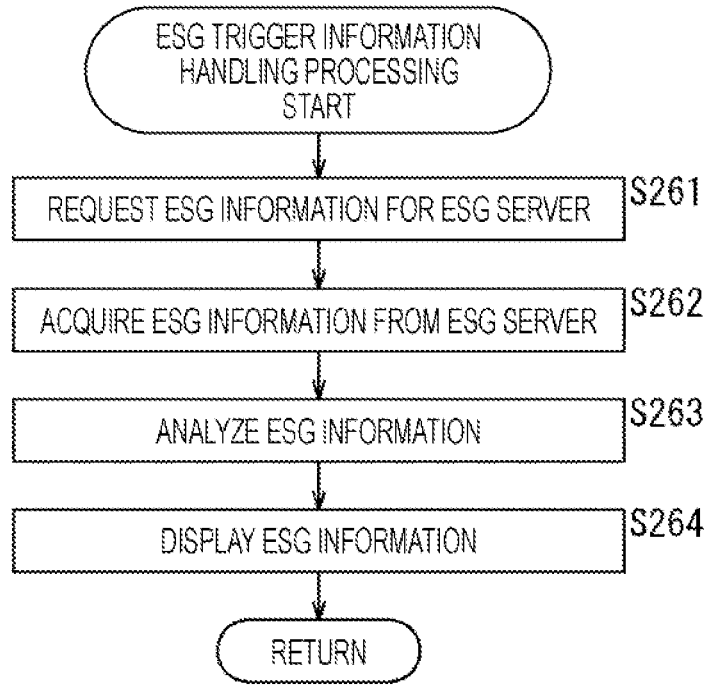
FIG. 29 is a flowchart for describing the flow of ESG trigger information handling processing.

Next, the flow of ESG trigger information handling processing corresponding to the processing of step S236 of FIG. 27 will be described with reference to the flowchart of FIG. 29.

At step S261, the processing unit 256 controls the communication unit 217 on the basis of the analysis result (location information contained in the ESG trigger information) of the processing of step S232 of FIG. 27 to access the ESG server 50 via the Internet 90, thereby requesting ESG information. At step S262, the processing unit 256 acquires, as a result of the request for the ESG server 50 in the processing of step S261, the ESG information delivered from the ESG server 50 via the Internet 90.

At step S263, the processing unit 256 analyzes the ESG information acquired by the processing of step S262. At step S264, the processing unit 256 displays the ESG information on the basis of an analysis result of the processing of step S263. At this point, a title or logo of a current program can be displayed, or detailed information on the current program can be displayed according to user's operation, for example.

When the processing of step S264 is completed, the processing returns to the processing of step S236 of FIG. 27, and then, the processing of step S236 and subsequent steps are executed.

The flow of the ESG trigger information handling processing has been described above.

(EAD Trigger Information Handling Processing)

Figure 30:
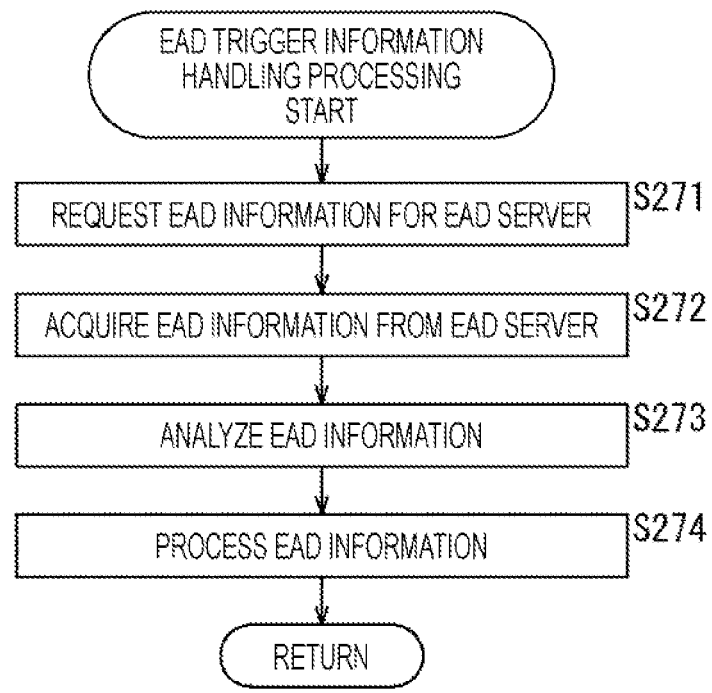
FIG. 30 is a flowchart for describing the flow of EAD trigger information handling processing.

Next, the flow of the EAD trigger information handling processing corresponding to the processing of step S238 of FIG. 27 will be described with reference to the flowchart of FIG. 30.

At step S271, the processing unit 256 controls the communication unit 217 on the basis of the analysis result (location information contained in the EAD trigger information) of the processing of step S232 of FIG. 27 to access the EAD server 60 via the Internet 90, thereby requesting EAD information. At step S272, the processing unit 256 acquires, as a result of the request for the EAD server 60 in the processing of step S271, the EAD information delivered from the EAD server 60 via the Internet 90.

At step S273, the processing unit 256 analyzes the EAD information acquired by the processing of step S272. At step S274, the processing unit 256 processes the EAD information on the basis of an analysis result of step S273. At this point, information on an emergency announcement contained in the EAD information can be displayed, or a web page regarding the emergency announcement can be, by accessing the server on the Internet 90 according to a URL contained in the EAD information, acquired and displayed, for example.

When the processing of step S274 is completed, the processing returns to the processing of step S238 of FIG. 27, and then, the processing of step S238 and subsequent steps are executed.

The flow of the EAD trigger information handling processing has been described above.

(RRD Trigger Information Handling Processing)

Figure 31:
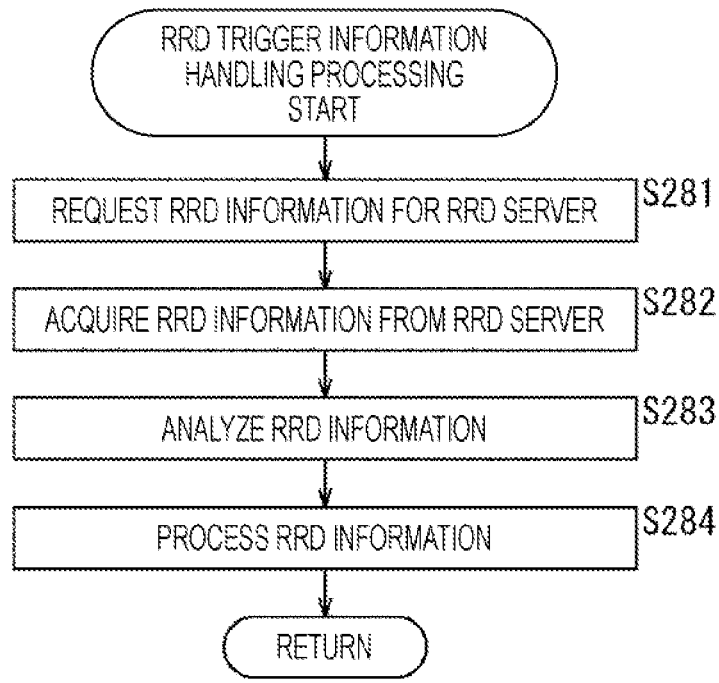
FIG. 31 is a flowchart for describing the flow of RRD trigger information handling processing.

Next, the flow of the RRD trigger information handling processing corresponding to the processing of step S240 of FIG. 27 will be described with reference to the flowchart of FIG. 31.

At step S281, the processing unit 256 controls the communication unit 217 on the basis of the analysis result (location information contained in the RRD trigger information) of the processing of step S232 of FIG. 27 to access the RRD server 70 via the Internet 90, thereby requesting RRD information. At step S282, the processing unit 256 acquires, as a result of the request for the RRD server 70 in the processing of step S281, the RRD information delivered from the RRD server 70 via the Internet 90.

At step S283, the processing unit 256 analyzes the RRD information acquired by the processing of step S282. At step S284, the processing unit 256 processes the RRD information on the basis of an analysis result of step S283. At this point, when viewing restriction (e.g., age restriction) is placed on the broadcast contents during reproduction thereof, if these requirements are not satisfied, reproduction of the broadcast contents can be stopped in the receiving device 20.

When the processing of step S284 is completed, the processing returns to the processing of step S240 of FIG. 27, and then, the processing of step S240 and subsequent steps are executed.

The flow of the RRD trigger information handling processing has been described above.

(Streaming Delivery Processing)

Figure 32:
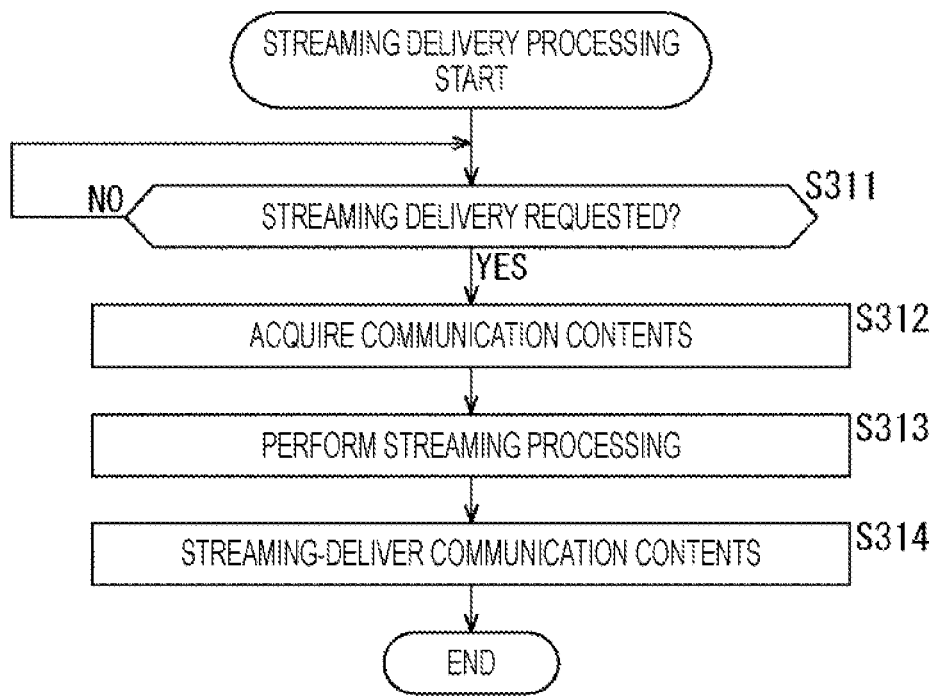
FIG. 32 is a flowchart for describing the flow of streaming delivery processing.

Next, the flow of streaming delivery processing executed by the streaming server 30 of FIG. 19 will be described with reference to the flowchart of FIG. 32.

At step S311, the control unit 311 constantly monitors the communication status of the communication unit 314 to determine whether or not streaming delivery of the communication contents are requested from the receiving device 20. In the determination processing of step S311, the processing proceeds to step S312 after streaming delivery of the communication contents has been requested from the receiving device 20. At step S312, the streaming processing unit 313 acquires, according to control from the control unit 311, the communication contents corresponding to the request from the receiving device 20, the communication contents being held in the content holding unit 312.

At step S313, the streaming processing unit 313 performs the processing of performing streaming delivery for the communication contents (the components forming the communication contents) acquired by the processing of step S312. At step S314, the communication unit 314 streaming-delivers, according to control from the control unit 311, the streams of the communication contents (the streams of the components forming the communication contents) to the delivery-requester-side receiving device 20 via the Internet 90, the communication contents being subjected to streaming in the processing of step S313. When the processing of step S314 is completed, the streaming delivery processing of FIG. 32 ends.

The flow of the streaming delivery processing has been described above.

(SCS Delivery Processing)

Figure 33:
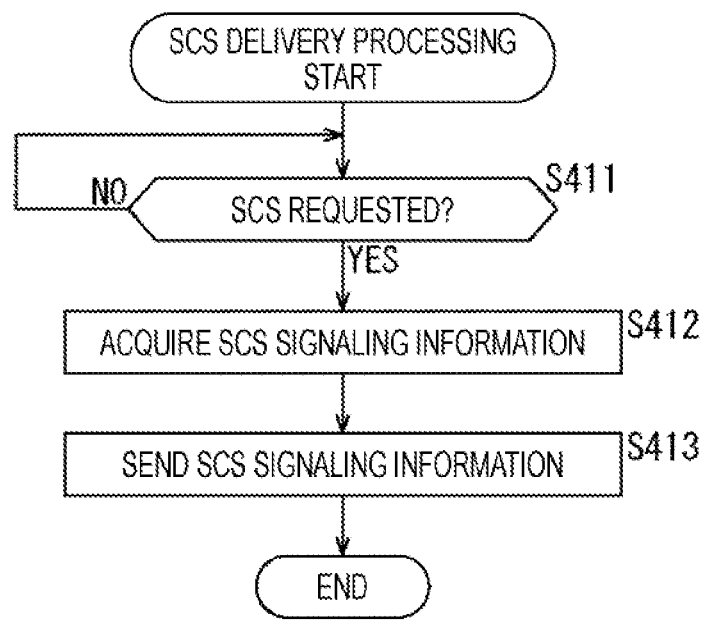
FIG. 33 is a flowchart for describing the flow of SCS delivery processing.

Next, the flow of SCS delivery processing executed by the SCS server 40 of FIG. 19 will be described with reference to the flowchart of FIG. 33.

At step S411, the control unit 411 constantly monitors the communication status of the communication unit 414 to determine whether or not a SCS is requested from the receiving device 20. In the determination processing of step S411, the processing proceeds to step S412 after the SCS has been requested from the receiving device 20.

At step S412, the communication unit 414 acquires, according to control from the control unit 411, the SCS signaling information (e.g., the MPD information) corresponding to the request from the receiving device 20, the SCS signaling information being held in the SCS holding unit 413. Then, at step S413, the communication unit 414 sends, according to control from the control unit 411, the SCS signaling information (e.g., the MPD information) to the SCS-requester-side receiving device 20 via the Internet 90, the SCS signaling information being acquired by the processing of step S412. When the processing of step S413 is completed, the SCS delivery processing of FIG. 33 ends.

The flow of the SCS delivery processing has been described above.

(ESG Delivery Processing)

Figure 34:
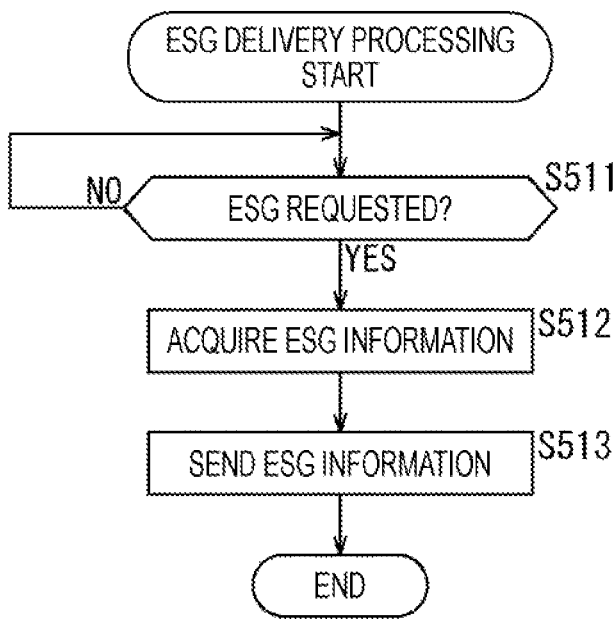
FIG. 34 is a flowchart for describing the flow of ESG delivery processing.

Next, the flow of ESG delivery processing executed by the ESG server 50 of FIG. 19 will be described with reference to the flowchart of FIG. 34.

At step S511, the control unit 511 constantly monitors the communication status of the communication unit 514 to determine whether or not an ESG is requested from the receiving device 20. In the determination processing of step S511, the processing proceeds to step S512 after the ESG has been requested from the receiving device 20.

At step S512, the communication unit 514 acquires, according to control from the control unit 511, the ESG information corresponding to the request from the receiving device 20, the ESG information being held in the ESG holding unit 513. Then, at step S513, the communication unit 514 sends, according to control from the control unit 511, the ESG information to the ESG-requester-side receiving device 20 via the Internet 90, the ESG information being acquired by the processing of step S512. When the processing of step S513 is completed, the ESG delivery processing of FIG. 34 ends.

The flow of the ESG delivery processing has been described above.

(EAD Delivery Processing)

Figure 35:
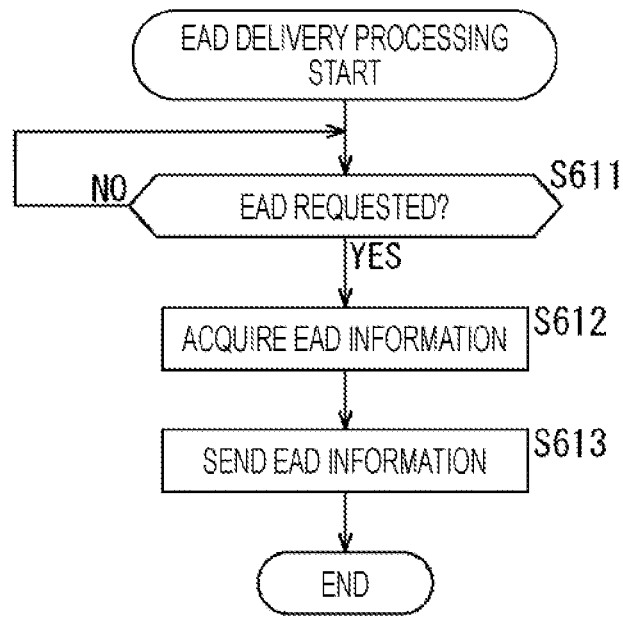
FIG. 35 is a flowchart for describing the flow of EAD delivery processing.

Next, the flow of EAD delivery processing executed by the EAD server 60 of FIG. 19 will be described with reference to the flowchart of FIG. 35.

At step S611, the control unit 611 constantly monitors the communication status of the communication unit 614 to determine whether or not EAD is requested from the receiving device 20. In the determination processing of step S611, the processing proceeds to step S612 after the BAD has been requested from the receiving device 20.

At step S612, the communication unit 614 acquires, according to control from the control unit 611, the EAD information corresponding to the request from the receiving device 20, the EAD information being held in the EAD holding unit 613. Then, at step S613, the communication unit 614 sends, according to control from the control unit 611, the EAD information to the EAD-requester-side receiving device 20 via the Internet 90, the EAD information being acquired by the processing of step S612. When the processing of step S613 is completed, the EAD delivery processing of FIG. 35 ends.

The flow of the EAD delivery processing has been described above.

(RRD Delivery Processing)

Figure 36:
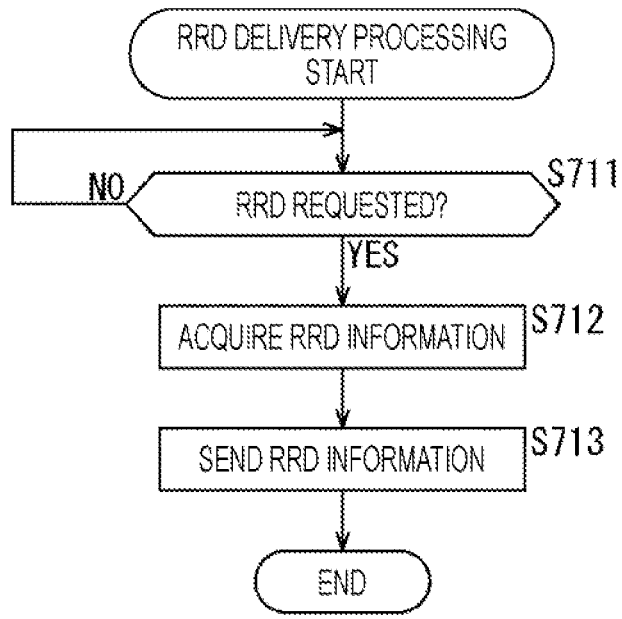
FIG. 36 is a flowchart for describing the flow of RRD delivery processing.

Next, the flow of RRD delivery processing executed by the RRD server 70 of FIG. 19 will be described with reference to the flowchart of FIG. 36.

At step S711, the control unit 711 constantly monitors the communication status of the communication unit 714 to determine whether or not RRD is requested from the receiving device 20. In the determination processing of step S711, the processing proceeds to step S712 after the RRD has been requested from the receiving device 20.

At step S712, the communication unit 714 acquires, according to control from the control unit 711, the RRD information corresponding to the request from the receiving device 20, the RRD information being held in the RRD holding unit 713. Then, at step S713, the communication unit 714 sends, according to control from the control unit 711, the RRD information to the RRD-requester-side receiving device 20 via the Internet 90, the RRD information being acquired by the processing of step S712. When the processing of step S713 is completed, the RRD delivery processing of FIG. 36 ends.

The flow of the RRD delivery processing has been described above.

(Trigger Information Delivery Processing)

Figure 37:
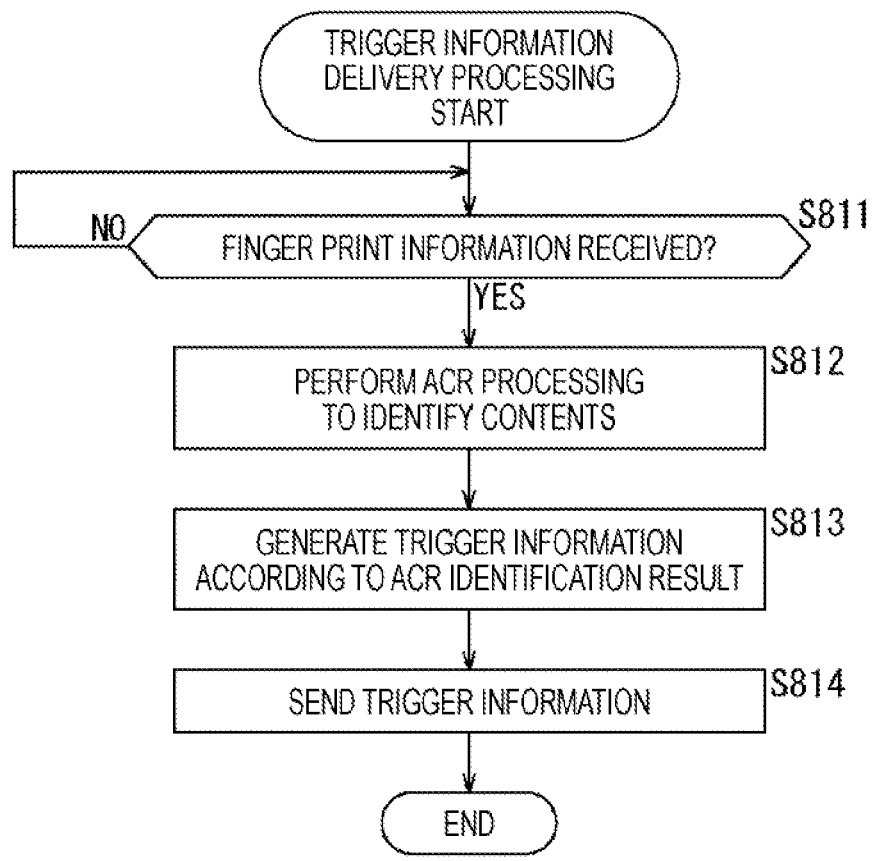
FIG. 37 is a flowchart for describing the flow of trigger information delivery processing.

Next, the flow of trigger information delivery processing executed by the ACR server 80 of FIG. 19 will be described with reference to the flowchart of FIG. 37.

In response to the inquiry about the trigger information from the receiving device 20, it is, at step S811, determined whether or not the finger print information is received. In the determination processing of step S811, the processing proceeds to step S812 after the finger print information has been received by the communication unit 811.

At step S812, the ACR identification processing unit 812 checks the finger print information received by the processing of step S811 against the FP database 813 prepared in advance, and then, performs the ACR identification processing of identifying the contents during reproduction thereof in the inquirer-side receiving device 20.

At step S813, the trigger information generation unit 814 generates the trigger information (the trigger information having the configuration of FIG. 3) for providing various functions on the basis of the result of the ACR identification processing acquired by the processing of step S812 and various types of information registered in the trigger information database 815.

At step S814, the communication unit 811 sends the trigger information to the inquirer-side receiving device 20 via the Internet 90, the trigger information being generated by the processing of step S813. When the processing of step S814 is completed, the trigger information delivery processing of FIG. 37 ends The flow of the trigger information delivery processing has been described above.

(TLT Delivery Processing)

Figure 38:
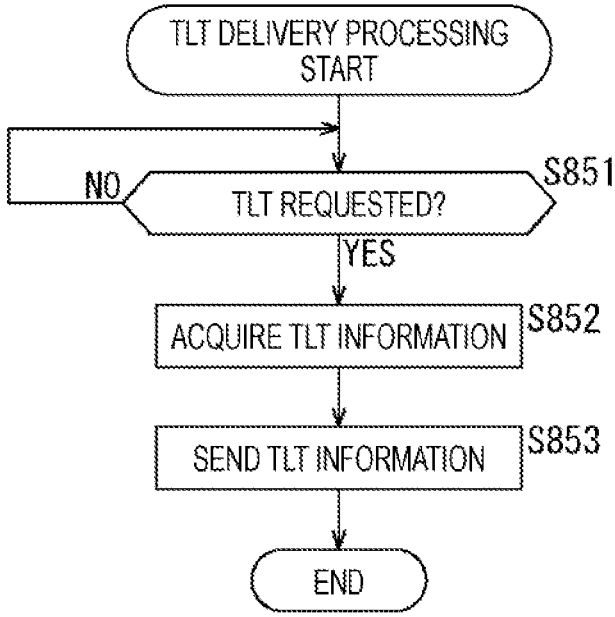
FIG. 38 is a flowchart for describing the flow of TLT delivery processing.

Next, the flow of TLT delivery processing executed by the TLT server 85 of FIG. 19 will be described with reference to the flowchart of FIG. 38.

At step S851, the control unit 851 constantly monitors the communication status of the communication unit 854 to determine whether or not TLT is requested from the receiving device 20. In the determination processing of step S851, the processing proceeds to step S852 after the TLT has been requested from the receiving device 20.

At step S852, the communication unit 854 acquires, according to control from the control unit 851, the TLT information corresponding to the request from the receiving device 20, the TLT information being held in the TLT holding unit 853. Then, at step S853, the communication unit 854 sends, according to control from the control unit 851, the TLT information to the TLT-requester-side receiving device 20 via the Internet 90, the TLT information being acquired by the processing of step S852. When the processing of step S853 is completed, the TLT delivery processing of FIG. 38 ends.

The flow of the TLT delivery processing has been described above.

Note that in the description made above, "D" as an abbreviation of Description is used as the name of the signaling information, but "T" as an abbreviation of Table may be used. For example, the emergency alerting description (EAD) may be written as an emergency alerting table (EAT). Moreover, the region rating description (RRD) may be written as a region rating table (RRT). Note that these name differences are formal differences between "Description" and "Table," and do not mean substantively-different contents among the types of signaling information.

<6. Configuration of Computer>

Figure 39:
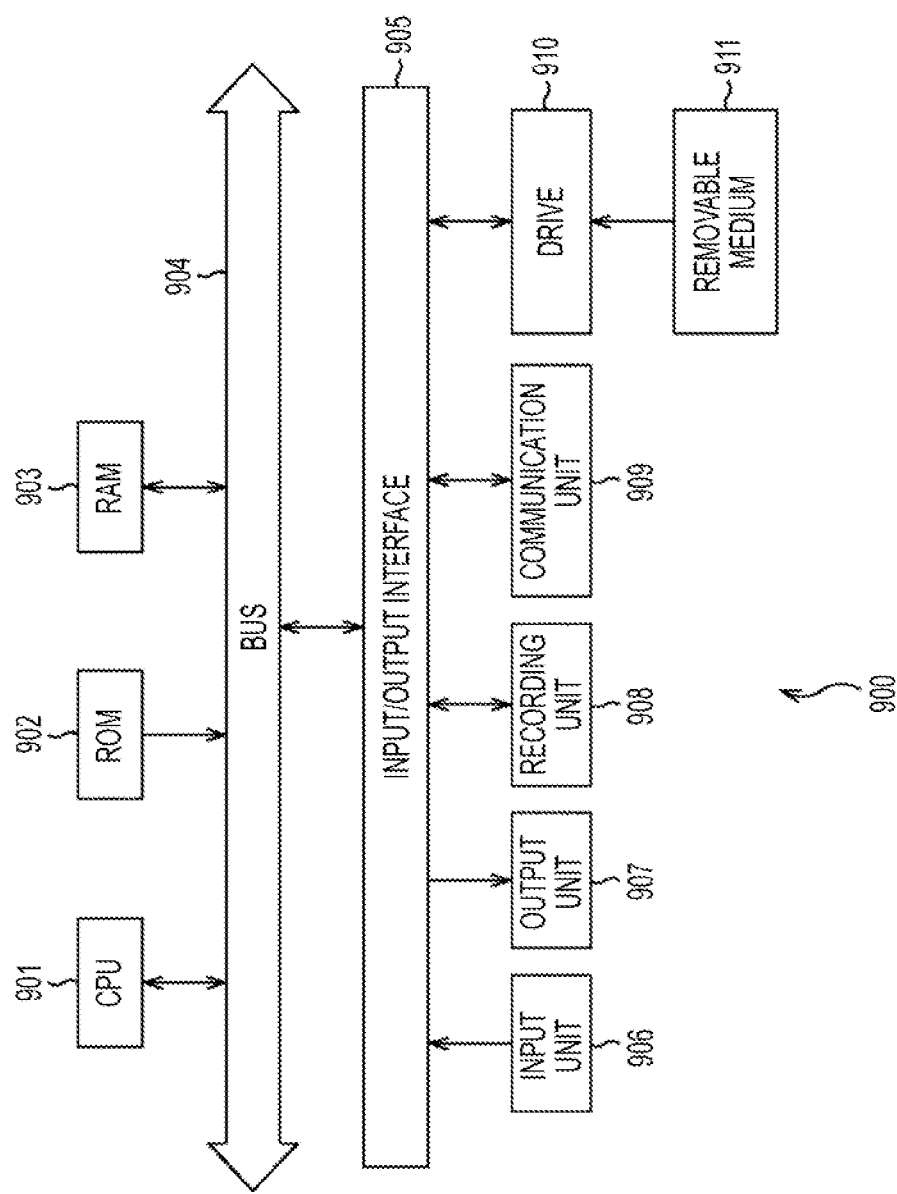
FIG. 39 is a diagram of a configuration example of a computer.

The above-described series of processing may be executed by hardware, or may be executed by software. In the case of executing the series of processing by the software, a program forming the software is installed in a computer. FIG. 39 is a diagram of a configuration example of hardware of the computer configured to execute the above-described series of processing by the program.

In a computer 900, a central processing unit (CPU) 901, a read only memory (ROM) 902, and a random access memory (RAM) 903 are interconnected via a bus 904. An input/output interface 905 is further connected to the bus 904. An input unit 906, an output unit 907, a recording unit 908, a communication unit 909, and a drive 910 are connected to the input/output interface 905.

The input unit 906 includes a keyboard, a mouse, a microphone, etc. The output unit 907 includes a display, a speaker, etc. The recording unit 908 includes a hard disk, a non-volatile memory, etc. The communication unit 909 includes a network interface etc. The drive 910 is configured to drive a removable medium 911 such as a magnetic disk, an optical disk, a magneto-optical disk, or a semiconductor memory.

In the computer 900 configured as described above, the above-described series of processing is performed in such a manner that the CPU 901 loads and executes the program in the RAM 903 via the input/output interface 905 and the bus 904, the program being stored in the ROM 902 or the recording unit 908.

The program executed by the computer 900 (the CPU 901) can be provided with the program being stored in the removable medium 911 as package medium etc., for example. Alternatively, the program can be provided via a wired or wireless transmission medium such as a local area network, the Internet, and digital satellite broadcasting.

In the computer 900, the program can be installed in the recording unit 908 via the input/output interface 905 by loading of the removable medium 911 in the drive 910. Alternatively, the program can be received by the communication unit 909 via the wired or wireless transmission medium, and then, can be installed in the recording unit 908. As another alternative, the program can be installed in advance in the ROM 902 or the recording unit 908.

Here, in the present specification, the processing performed by the computer according to the program is not necessarily performed in chronological order as described in the flowcharts. That is, the processing performed by the computer according to the program also includes processing (e.g., parallel processing or processing using an object) performed in parallel or performed separately. Moreover, the program may be processed by a single computer (a single processor), or may be subjected to distributed processing by a plurality of computers.

Note that the embodiment of the present technology is not limited to the above-described embodiment, and various modifications may be made without departing from the gist of the present technology.

Moreover, the present technology may employ the following configurations.

(1)
A receiving device including:
an acquiring unit configured to acquire trigger information for providing various functions, the trigger information containing type information indicating a type of the trigger information and channel information indicating a series for each function provided by the trigger information; and
a processing unit configured to perform processing corresponding to each function on the basis of the trigger information identified by the type information and the channel information.

(2)
The receiving device according to (1), wherein
the trigger information contains version information for the channel information, and
the acquiring unit acquires the trigger information when the version information is updated.

(3)
The receiving device according to (2), wherein
the trigger information includes, in digital broadcasting using an Internet protocol (IP) transmission method, information for providing a function for signaling information transmitted at a level higher than an IP layer in a protocol hierarchy in the IP transmission method, and
the processing unit performs, on the basis of the trigger information, processing corresponding to the function for the signaling information.

(4)
The receiving device according to (2), wherein
the trigger information includes information for providing a function for an electronic program listing, and
the processing unit performs, on the basis of the trigger information, processing corresponding to the function for the electronic program listing.

(5)
The receiving device according to (2), wherein
the trigger information includes information for providing a function for an emergency announcement, and
the processing unit performs, on the basis of the trigger information, processing corresponding to the function for the emergency announcement.

(6)
The receiving device according to (2), wherein
the trigger information includes information for providing a function for viewing restriction of contents, and
the processing unit performs, on the basis of the trigger information, processing corresponding to the function for the viewing restriction.

(7)
The receiving device according to any of (1) to (6), wherein
the trigger information contains location information by which a resource on the Internet is identifiable, and
the processing unit accesses, on the basis of the location information, a server on the Internet to acquire information corresponding to each function.

(8)
The receiving device according to any of (1) to (7), wherein
the acquiring unit
acquires a trigger channel list as a list of the trigger information transmitted for the series indicated by the channel information, and
acquires the trigger information on the basis of the trigger channel list.

(9)
The receiving device according to any of (1) to (8), wherein
the trigger information is delivered while being contained in a broadcast wave of digital broadcasting using an IP transmission method, or is delivered from a server provided on the Internet and having a content recognition function.

(10)
A receiving method of a receiving device, including the steps of:
acquiring, by the receiving device, trigger information for providing various functions, the trigger information containing type information indicating a type of the trigger information and channel information indicating a series for each function provided by the trigger information; and
performing, by the receiving device, processing corresponding to each function on the basis of the trigger information identified by the type information and the channel information.

(11)
A transmission device including:
a generation unit configured to generate trigger information for providing various functions, the trigger information containing type information indicating a type of the trigger information and channel information indicating a series for each function provided by the trigger information; and a sending unit configured to send the generated trigger information.

(12)

The transmission device according to (11), wherein the trigger information contains version information for the channel information.

(13)

The transmission device according to (12), wherein the trigger information includes, in digital broadcasting using an IP transmission method, information for providing a function for signaling information transmitted at a level higher than an IP layer in a protocol hierarchy in the IP transmission method.

(14)

The transmission device according to (12), wherein the trigger information includes information for providing a function for an electronic program listing.

(15)

The transmission device according to (12), wherein the trigger information includes information for providing a function for an emergency announcement.

(16)

The transmission device according to (12), wherein the trigger information includes information for providing a function for viewing restriction of contents.

(17)

The transmission device according to any of (11) to (16), wherein the trigger information contains location information by which a resource on the Internet is identifiable.

(18)

The transmission device according to any of (11) to (17), wherein the sending unit sends the trigger information while being contained in a broadcast wave of digital broadcasting using an IP transmission method.

(19)

A transmission method of a transmission device, including:

a step of generating, by the transmission device, trigger information for providing various functions, the trigger information containing type information indicating a type of the trigger information and channel information indicating a series for each function provided by the trigger information; and a step of sending the generated trigger information by the transmission device.

REFERENCE SIGNS LIST

1 Broadcast communication system
Transmission device
Receiving device
Streaming server
SCS server
50 ESG server
60 EAD server
70 RRD server
80 ACR server
85 TLT server
90 Internet
111 Signaling information generation unit
117 Trigger information generation unit
119 Sending unit
212 Tuner
214 Control unit
217 Communication unit
251 Signaling information acquiring unit
252 Trigger information acquiring unit
253 Finger print information acquiring unit
254 Analyzing unit
255 Media time counting unit
256 Processing unit
814 Trigger information generation unit
852 TLT generation unit
900 Computer
901 CPU

The invention claimed is:

1. A receiving device, comprising:
a receiver configured to receive video data and audio data; and
circuitry configured to:
acquire trigger information embedded in at least one of the video data or the audio data, the trigger information including:
type information indicating that the trigger information corresponds to function information including one of service signaling information, emergency alerting information, electronic service guide information, viewing history information, or application control information, and
location information indicating a location of an external server corresponding to the function information;
access the external server based on the location information; and
acquire from the external server:
the service signaling information if the type information indicates that the function information corresponds to the service signaling information,
the emergency alerting information if the type information indicates that the function information corresponds to the emergency alerting information,
the electronic service guide information if the type information indicates that the function information corresponds to the electronic service guide information,
the viewing history information if the type information indicates that the function information corresponds to the viewing history information, or
the application control information if the type information indicates that the function information corresponds to the application control information.

2. The receiving device according to claim 1, wherein:
the trigger information includes version information, and
a change in the version information indicates a change of the trigger information.

3. The receiving device according to claim 1, wherein:
the service signaling information is received via digital broadcasting using an Internet Protocol (IP) transmission scheme at a level higher than an IP layer in a protocol hierarchy, and
the circuitry is configured to perform, on a basis of the trigger information, processing corresponding to a function for the service signaling information.

4. The receiving device according to claim 1, wherein the location information is a universal resource identifier (URI) of the external server.

5. The receiving device according to claim 1, wherein the trigger information is embedded in the at least one of the video data or the audio data in a watermark.

6. The receiving device according to claim 1, wherein
the service signaling information includes a media presentation description (MPD) according to a Moving Picture Expert Group-Dynamic Adaptive Streaming over HTTP (MPEG-DASH) standard, including a Period element, an AdaptationSet element, and a Representation element,
the type information indicates that the function information corresponds to the MPD, and
the circuitry is configured to acquire the MPD from the external server and acquire contents including broadband contents based on the MPD.

7. A receiving method of a receiving device, comprising:
receiving, by a receiver of the receiving device, video data and audio data;
acquiring, by circuitry of the receiving device, trigger information embedded in at least one of the video data or the audio data, the trigger information including:
type information indicating that the trigger information corresponds to function information including one of service signaling information, emergency alerting information, electronic service guide information, viewing history information, or application control information, and
location information indicating a location of an external server corresponding to the function information;
accessing, by the circuitry of the receiving device, the external server based on the location information; and
acquiring, by the circuitry of the receiving device, from the external server:
the service signaling information if the type information indicates that the function information corresponds to the service signaling information,
the emergency alerting information if the type information indicates that the function information corresponds to the emergency alerting information,
the electronic service guide information if the type information indicates that the function information corresponds to the electronic service guide information,
the viewing history information if the type information indicates that the function information corresponds to the viewing history information, or
the application control information if the type information indicates that the function information corresponds to the application control information.

8. The receiving method according to claim 7, wherein:
the trigger information includes version information, and a change in the version information indicates a change of the trigger information.

9. The receiving method according to claim 7, wherein:
the service signaling information is received via digital broadcasting using an Internet Protocol (IP) transmission scheme at a level higher than an IP layer in a protocol hierarchy, and
the method further comprises, performing, by the circuitry of the receiving device on a basis of the trigger information, processing corresponding to a function for the service signaling information.

10. The receiving method according to claim 7, wherein the location information is a universal resource identifier (URI) of the external server.

11. The receiving method according to claim 7, wherein the trigger information is embedded in the at least one of the video data or the audio data in a watermark.

12. The receiving method according to claim 7, wherein
the service signaling information includes a media presentation description (MPD) according to a Moving Picture Expert Group-Dynamic Adaptive Streaming over HTTP (MPEG-DASH) standard, including a Period element, an AdaptationSet element, and a Representation element,
the type information indicates that the function information corresponds to the MPD, and
the acquiring the service signaling information comprises acquiring the MPD from the external server and acquire contents including broadband contents based on the MPD.

13. A non-transitory computer-readable medium storing instructions which when executed by a computer cause the computer to perform a method, and the method comprising:
receiving video data and audio data;
acquiring trigger information embedded in at least one of the video data or the audio data, the trigger information including:
type information indicating that the trigger information corresponds to function information including one of service signaling information, emergency alerting information, electronic service guide information, viewing history information, or application control information, and
location information indicating a location of an external server corresponding to the function information;
accessing the external server based on the location information; and
acquiring from the external server:
the service signaling information if the type information indicates that the function information corresponds to the service signaling information,
the emergency alerting information if the type information indicates that the function information corresponds to the emergency alerting information,
the electronic service guide information if the type information indicates that the function information corresponds to the electronic service guide information,
the viewing history information if the type information indicates that the function information corresponds to the viewing history information, or
the application control information if the type information indicates that the function information corresponds to the application control information.

14. The non-transitory computer-readable medium according to claim 13, wherein
the trigger information includes version information, and a change in the version information indicates a change of the trigger information.

15. The non-transitory computer-readable medium according to claim 13, wherein:
the service signaling information is received via digital broadcasting using an Internet Protocol (IP) transmission scheme at a level higher than an IP layer in a protocol hierarchy, and
the method further comprises, performing, on a basis of the trigger information, processing corresponding to a function for the service signaling information.

16. The non-transitory computer-readable medium according to claim 13, wherein the location information is a universal resource identifier (URI) of the external server.

17. The non-transitory computer-readable medium according to claim 13, wherein the trigger information is embedded in the at least one of the video data or the audio data in a watermark.

18. The non-transitory computer-readable medium according to claim 13, wherein
- the service signaling information includes a media presentation description (MPD) according to a Moving Picture Expert Group-Dynamic Adaptive Streaming over HTTP (MPEG-DASH) standard, including a Period element, an AdaptationSet element, and a Representation element,
- the type information indicates that the function information corresponds to the MPD, and
- the acquiring the service signaling information comprises acquiring the MPD from the external server and acquire contents including broadband contents based on the MPD.

\* \* \* \* \*